(12) United States Patent
Deshmukh et al.

(10) Patent No.: US 12,139,094 B2
(45) Date of Patent: Nov. 12, 2024

(54) FRONT CENTER AIRBAGS

(71) Applicant: MULLEN TECHNOLOGIES, INC., Brea, CA (US)

(72) Inventors: Kedar Deshmukh, Irvine, CA (US); Robert Huotari, Irvine, CA (US); Marc Papakyriakou, Irvine, CA (US)

(73) Assignee: MULLEN TECHNOLOGIES, INC, Brea, CA (US)

( * ) Notice: Subject to any disclaimer, the term of this patent is extended or adjusted under 35 U.S.C. 154(b) by 0 days.

(21) Appl. No.: 18/369,818

(22) Filed: Sep. 18, 2023

(65) Prior Publication Data

US 2024/0300437 A1    Sep. 12, 2024

Related U.S. Application Data

(60) Provisional application No. 63/450,887, filed on Mar. 8, 2023.

(51) Int. Cl.
  *B60R 21/232*    (2011.01)
  *B60R 21/214*    (2011.01)
  *B60R 21/231*    (2011.01)
  *B60R 21/2338*   (2011.01)

(52) U.S. Cl.
  CPC .......... *B60R 21/232* (2013.01); *B60R 21/214* (2013.01); *B60R 2021/23107* (2013.01); *B60R 2021/23161* (2013.01); *B60R 2021/23386* (2013.01)

(58) Field of Classification Search
  CPC ............... B60R 21/232; B60R 21/214; B60R 2021/23107; B60R 2021/23161; B60R 2021/23386
  See application file for complete search history.

(56) References Cited

U.S. PATENT DOCUMENTS

| | | | |
|---|---|---|---|
| 6,533,316 B2 | 3/2003 | Breed et al. | |
| 6,966,576 B1* | 11/2005 | Greenstein | B60R 21/23138 280/737 |
| 7,971,901 B2 | 7/2011 | Tomitaka et al. | |
| 8,353,529 B2 | 1/2013 | Tomitaka et al. | |
| 10,300,880 B2 | 5/2019 | Mihm | |
| 10,875,488 B2 | 12/2020 | Kanegae | |
| 10,926,735 B2 | 2/2021 | Deng et al. | |
| 11,479,200 B1* | 10/2022 | Gao | B60R 21/20 |
| 2015/0197209 A1* | 7/2015 | Fujiwara | B60R 21/231 280/730.1 |
| 2016/0144818 A1* | 5/2016 | Mihm | B60R 21/2338 280/730.2 |
| 2017/0225641 A1 | 8/2017 | Faruque et al. | |
| 2018/0043853 A1* | 2/2018 | Taguchi | B60R 21/231 |

FOREIGN PATENT DOCUMENTS

| | | | | |
|---|---|---|---|---|
| CN | 101801733 A | * | 8/2010 | ........... B60R 21/231 |
| CN | 101801735 A | * | 8/2010 | ........... B60R 21/231 |
| CN | 101837766 A | * | 9/2010 | ........ B60R 21/23138 |
| CN | 103707840 A | * | 4/2014 | ........... B60R 21/207 |
| CN | 109808632 A | * | 5/2019 | ......... B60R 21/0136 |

(Continued)

*Primary Examiner* — Drew J Brown
(74) *Attorney, Agent, or Firm* — Van Court & Aldridge LLP

(57) ABSTRACT

Airbags deployable along a height of a traveler in a vehicle and methods for using the same are provided.

43 Claims, 16 Drawing Sheets

(56) References Cited

FOREIGN PATENT DOCUMENTS

| | | | | |
|---|---|---|---|---|
| CN | 110431048 A | * | 11/2019 | ............... B60N 2/14 |
| CN | 112109655 A | * | 12/2020 | ........... B60R 21/013 |
| DE | 102020107161 A1 | * | 9/2021 | |
| JP | 2009154709 A | * | 7/2009 | |
| WO | WO-2012108632 A1 | * | 8/2012 | ............. B60R 21/20 |

* cited by examiner

FRONT CENTER AIRBAGS

CROSS REFERENCE TO RELATED APPLICATION(S)

This application claims the benefit of prior filed U.S. Provisional Patent Application No. 63/450,887, filed Mar. 8, 2023, which is hereby incorporated by reference herein in its entirety.

COPYRIGHT NOTICE

At least a portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to airbags and, more particularly, to front center airbags deployable along a height of a traveler in a vehicle and methods for using the same.

BACKGROUND OF THE DISCLOSURE

Many airbags are deployed in a direction towards an unpredictable or irregular surface of a vehicle, thereby reducing the effectiveness of the airbags.

SUMMARY OF THE DISCLOSURE

This document describes airbags deployable along a side of a traveler in a vehicle and methods for using the same.

For example, a system is provided for deploying an airbag along a side of a traveler in a vehicle as disclosed herein.

As another example, a method is provided for deploying an airbag along a side of a traveler in a vehicle as disclosed herein.

As yet another example, a non-transitory computer-readable storage medium storing at least one program is provided, the at least one program including instructions, which, when executed by at least one processor of an electronic subsystem, cause the at least one processor to deploy an airbag along a side of a traveler in a vehicle as disclosed herein.

As yet another example, a user electronic device including a memory component, a communications component, and a processor coupled to the memory component and the communications component is provided, wherein the processor is configured to deploy an airbag along a side of a traveler in a vehicle as disclosed herein.

As yet another example, a vehicle is provided that includes a ceiling, a floor, and an airbag deployment system that includes an airbag and that is operative to deploy the airbag away from the ceiling towards the floor or away from the floor towards the ceiling.

As yet another example, a method is provided for deploying an airbag in a vehicle that includes a ceiling, a floor, and an airbag deployment system including an airbag, the method including detecting, using the airbag deployment system, an airbag deployment event of the vehicle and, in response to detecting the airbag deployment event, deploying, using the airbag deployment system, the airbag away from the ceiling towards the floor or away from the floor towards the ceiling.

As yet another example, a non-transitory computer-readable storage medium storing at least one program is provided, the at least one program including instructions, which, when executed by at least one processor of an electronic airbag deployment system of a vehicle including an airbag, cause the at least one processor to detect, using the airbag deployment system, an airbag deployment event of the vehicle and, in response to detection of the airbag deployment event, deploy, using the airbag deployment system, the airbag away from the ceiling towards the floor or away from the floor towards the ceiling.

This Summary is provided to summarize some example embodiments, so as to provide a basic understanding of some aspects of the subject matter described in this document.

Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 2E1-2E4 are similar side views of a portion of the vehicle of FIGS. 2, 2A, and 2B, taken from line IIE-IIE of FIG. 2A at different stages of airbag deployment in accordance with some embodiments of the disclosure;

FIGS. 2F1-2F4 are rear views of a portion of the vehicle of FIGS. 2, 2A, and 2B, taken from line IIF-IIF of FIG. 2B at different stages of airbag deployment in accordance with some embodiments of the disclosure;

FIG. 4 is a rear view, similar to FIG. 2A and FIG. 3, of yet another vehicle with yet another airbag deployment system in accordance with some embodiments of the disclosure;

DETAILED DESCRIPTION OF THE DISCLOSURE

Airbags deployable along a height of a traveler in a vehicle and methods for using the same are provided.

Airbags (e.g., center airbags (e.g., front center airbags ("FCABs"))) may be mounted to or within one or more seats of a vehicle (e.g., for sideways deployment). Alternatively or additionally, an airbag may be mounted to or within a headliner of a vehicle for downward deployment (e.g., towards a vehicle floor, center console, and/or upwards deploying airbag) and/or an airbag may be mounted to or within a vehicle floor or center console of a vehicle for upward deployment (e.g., towards a vehicle ceiling, sunroof, headliner, and/or downward deploying airbag). For example, when an airbag is deployed from a seat, it may be deployed towards an adjacent seat, which may provide an irregular or non-existent impact surface or reaction surface (e.g., if the two seats are not aligned during deployment (e.g., if one seat is advanced forward and another reclined rearward). However, if an airbag is configured to be deployed downward from an interior ceiling of the vehicle towards an opposing center console or floor surface or middle seat surface, a more regular and consistent impact or reaction surface may be provided for enabling a more efficient and/or effective airbag deployment and safety process (e.g., such an airbag may be provided with a deployment surface having a sufficient coefficient of friction for enabling stabilization on a stable surface of a facing center console or floor). Similarly, if an airbag is configured to be deployed upward from an interior floor or top of a center console of the vehicle towards an opposing interior ceiling or headliner or sunroof or the like, a more regular and consistent impact or reaction surface may be provided for enabling a more efficient and/or effective airbag deployment and safety process (e.g., such an airbag may be provided with a deployment surface having a sufficient coefficient of friction for enabling stabilization on a stable surface of a facing ceiling or headliner or sunroof or the like). Such airbags may be deployed along a height of a traveler (e.g., from above their head down to their midsection or waist or feet or up from their midsection or waist or feet to above their head).

Figure 1:
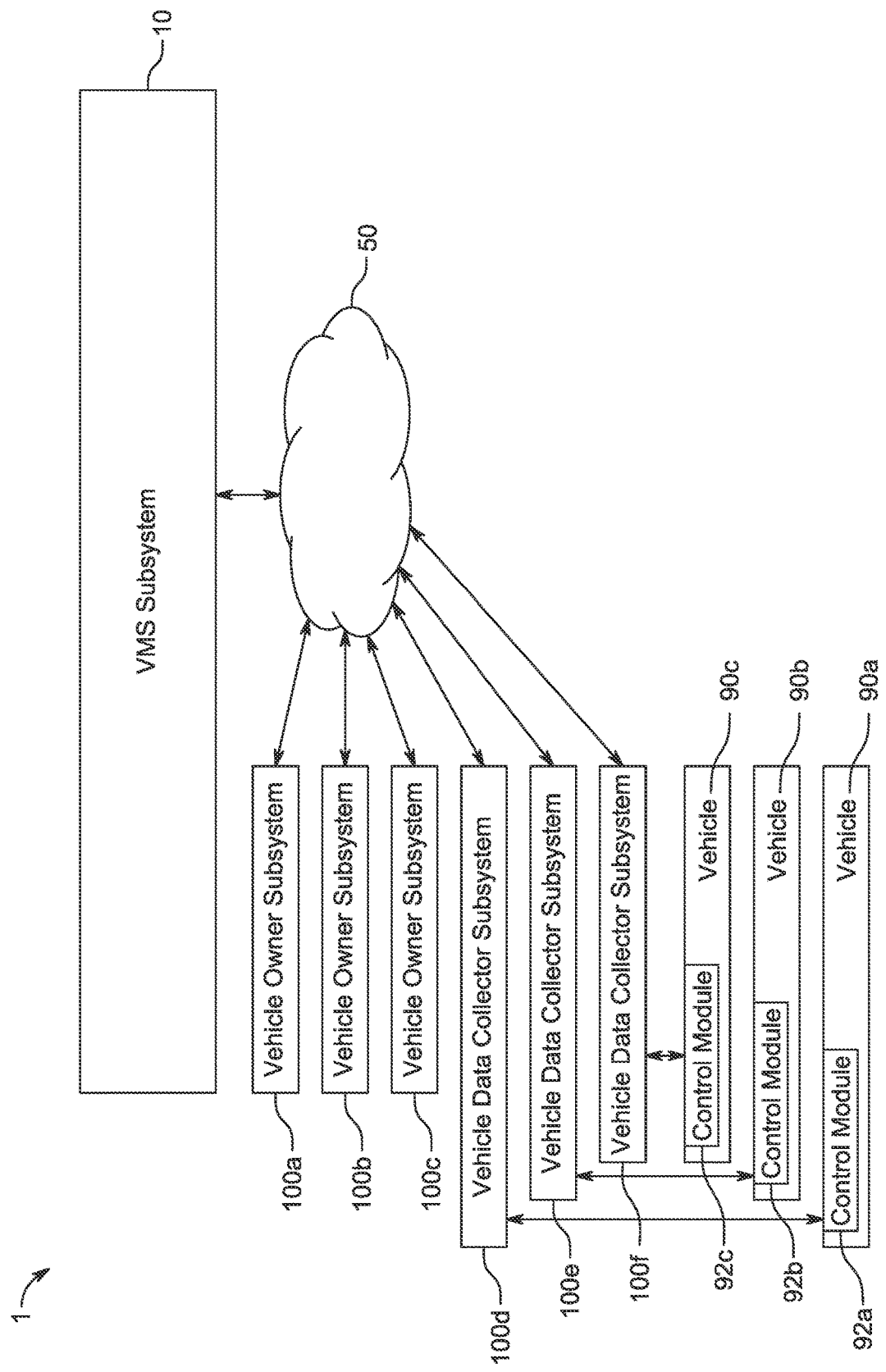
FIG. 1 is a schematic view of an illustrative system that may provide a vehicle management service in accordance with some embodiments of the disclosure.

FIG. 1 is a schematic view of an illustrative system 1 in which a vehicle management service, including, but not limited to airbag deployment, may be facilitated amongst one or more various entities. For example, as shown in FIG. 1, system 1 may include a vehicle management service ("VMS") subsystem 10, various subsystems 100 (e.g., one or more vehicle owner ("VO") subsystems 100a-100c, one or more vehicle data collector ("VDC") subsystems 100d-100f, each of which may be communicatively coupled to one or more control modules ("CMs") 92 of a respective vehicle 90 (e.g., CMs 92a-92c of respective vehicles 90a-90c that may be owned or operated or managed or controlled by of owners of respective vehicle owner subsystems 100a-100c), and at least one communications network 50 through which any two or more of the subsystems 10 and 100 may communicate. VMS subsystem 10 may be operative to interact with any of the various subsystems 100 to provide a vehicle management service platform ("VMSP") that may facilitate various vehicle management services, including, but not limited to, managing and enhancing the vehicle ownership process for vehicle buyers, vehicle users, and vehicle sellers for enabling effective and efficient vehicle transactions.

Figure 1A:
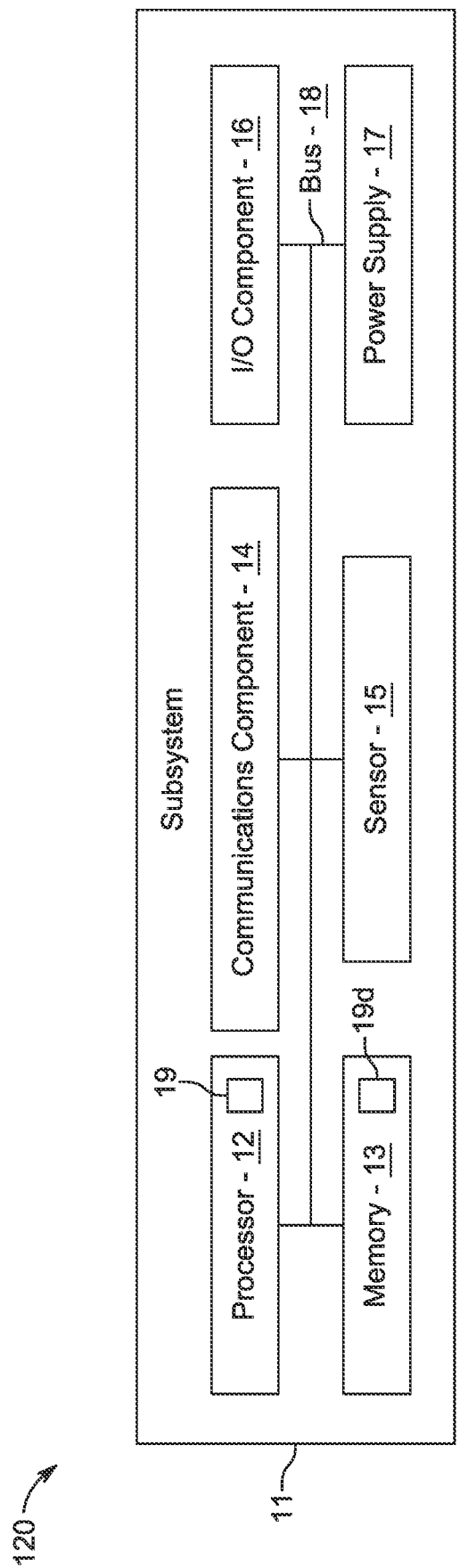
FIG. 1A is a more detailed schematic view of a subsystem of the system of FIG. 1.

As shown in FIG. 1A, and as described in more detail below, a subsystem 120, which may be any of subsystems 10, 100, and/or modules 92, may include a processor component 12, a memory component 13, a communications component 14, a sensor component 15, an input/output ("I/O") component 16, a power supply component 17, and/or a bus 18 that may provide one or more wired or wireless communication links or paths for transferring data and/or power to, from, or between various other components of subsystem 120. In some embodiments, one or more components of subsystem 120 may be combined or omitted. Moreover, subsystem 120 may include other components not combined or included in FIG. 1A and/or several instances of the components shown in FIG. 1A. For the sake of simplicity, only one of each of the components of subsystem 120 is shown in FIG. 1A. I/O component 16 may include at least one input component (e.g., button, mouse, keyboard, etc.) to receive information from a user and/or at least one output component (e.g., audio speaker, video display, haptic component, etc.) to provide information or any other suitable support to a user, such as a touch screen that may receive input information through a user's touch of a display screen and that may also provide visual information to a user via that same display screen, or an airbag that may be deployed to provide security to one or more passengers of a vehicle user, and/or the like. Memory 13 may include one or more storage mediums or media, including for example, a hard-drive, flash memory, permanent memory such as read-only memory ("ROM"), semi-permanent memory such as random access memory ("RAM"), any other suitable type of storage component, or any combination thereof (e.g., for storing any suitable data (e.g., data 19d)). Communications component 14 may be provided to allow subsystem 120 to communicate with one or more other subsystems 120 (e.g., any communication to/from/ between subsystem(s)/module(s) 10, 100, and 92 of system 1) using any suitable communications protocol. Communications component 14 can be operative to create or connect to a communication network or link of a network. Communications component 14 can provide wireless communications using any suitable short-range or long-range communications protocol, such as Wi-Fi (e.g., an 802.11 protocol), Bluetooth, ultra-wideband, radio frequency systems (e.g., 1200 MHz, 2.4 GHz, and 5.6 GHz communication systems), near field communication ("NFC"), infrared, protocols used by wireless and cellular telephones and personal e-mail devices, or any other protocol supporting wireless communications. Communications component 14 can also be operative to connect to a wired communications link or directly to another data source wirelessly or via one or more wired connections or other suitable connection type(s). Communications component 14 may be a network interface that may include the mechanical, electrical, and/or signaling circuitry for communicating data over physical links that may be coupled to other devices of a network. Such network interface(s) may be configured to transmit and/or receive any suitable data using a variety of different communication protocols, including, but not limited to, TCP/IP, UDP, ATM, synchronous optical networks ("SONET"), any suitable wired protocols or wireless protocols now known or to be discovered, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access.

Sensor 15 may be any suitable sensor that may be configured to sense any suitable data for subsystem 120 (e.g., location-based data via a GPS sensor system, motion data, environmental data, biometric data, etc.). Sensor 15 may be a sensor assembly that may include any suitable sensor or any suitable combination of sensors operative to detect movements of subsystem 120 and/or of any user thereof and/or any other characteristics of subsystem 120 and/or of its environment (e.g., physical activity or other characteristics of a user of subsystem 120, light content of the device environment, gas pollution content of the device environment, noise pollution content of the device environment, altitude of the device, etc.). Sensor 15 may include any suitable sensor(s), including, but not limited to, one or more of a GPS sensor, wireless communication sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. Sensor 15 may include any suitable sensor components or subassemblies for detecting any suitable movement of subsystem 120 and/or of a user thereof. For example, sensor 15 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor 15 may include one or more single-axis or two-axis acceleration motion sensors that may be operative to detect linear acceleration only along each of the x- or left/right direction and the y- or up/down direction, or along any other pair of directions. In some embodiments, sensor 15 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 15 may be operative to directly or indirectly detect rotation, rotational movement, angular displacement, tilt, position, orientation, motion along a non-linear (e.g., arcuate) path, or any other non-linear motions. Additionally or alternatively, sensor 15 may include one or more angular rate, inertial, and/or gyro-motion sensors or gyroscopes for detecting rotational movement. For example, sensor 15 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor 15 for detecting motion on subsystem 120, such as any suitable pressure sensors, altimeters, or the like. Using sensor(s) 15, subsystem 120 may be configured to determine a velocity, acceleration, orientation, and/or any other suitable motion attribute of subsystem 120 (e.g., a direction and/or strength of an impact (e.g., a crash involving a vehicle 90), a direction and/or speed of the vehicle, a direction and/or speed of a passenger, etc.). One or more biometric sensors may be multi-modal biometric sensors and/or operative to detect long-lived biometrics, modern liveness (e.g., active, passive, etc.) biometric detection, and/or the like. Sensor 15 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to subsystem 120 for attempting to authenticate a user), line-in connector for data and/or power, and/or combinations thereof. In some examples, each sensor can be a separate device, while, in other examples, any combination of two or more of the sensors can be included within a single subsystem or device. For example, a gyroscope, accelerometer, photoplethysmogram, galvanic skin response sensor, and temperature sensor can be included within a wearable electronic device, such as a smart watch, while a scale, blood pressure cuff, blood glucose monitor, $SpO_2$ sensor, respiration sensor, posture sensor, stress sensor, and asthma inhaler can each be separate devices. While specific examples are provided, it should be appreciated that other sensors can be used and other combinations of sensors can be combined into a single subsystem or device. Subsystem 120 can further include a timer that can be used, for example, to add time dimensions to various attributes of any detected element(s). Sensor 15 may include any suitable sensor components or subassemblies for detecting any suitable characteristics of any suitable condition of the lighting of the environment of subsystem 120. For example, sensor 15 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of subsystem 120 (e.g., in lux or lumens per square meter, etc.) and/or for determining the ambient color or white point chromaticity of ambient light in the environment of subsystem 120 (e.g., in hue and colorfulness or in x/y parameters with respect to an x-y chromaticity space, etc.) and/or for determining the UV index or UV radiation in the environment of subsystem 120 (e.g., in UV index units, etc.). Sensor 15 may include any suitable sensor components or subassemblies for detecting any suitable characteristics of any suitable condition of the air quality of the environment of subsystem 120. For example, sensor 15 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of subsystem 120 (e.g., in $O_2$% per liter, etc.) and/or for determining the air velocity of the ambient air in the environment of subsystem 120 (e.g., in kilograms per second, etc.) and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of subsystem 120 (e.g., in HG % per liter, etc.) and/or for determining the humidity of the ambient air in the environment of subsystem 120 (e.g., in grams of water per cubic meter, etc. (e.g., using a hygrometer)) and/or for determining the temperature of the ambient air in the environment of subsystem 120 (e.g., in degrees Celsius, etc. (e.g., using a thermometer)). Sensor 15 may include any suitable sensor components or subassemblies for detecting any suitable characteristics of any suitable condition of the sound quality of the environment of subsystem 120. For example, sensor 15 may include any suitable sound quality sensor that may include, but is not limited to, one or more microphones or the like that may determine the level of sound pollution or noise in the environment of subsystem 120 (e.g., in decibels, etc.). Sensor 15 may also include any other suitable sensor for determining any other suitable characteristics about a user of subsystem 120 and/or the environment of subsystem 120 and/or any situation within which subsystem 120 may be existing. For example, any suitable clock and/or position sensor(s) may be provided to determine the current time and/or time zone within which subsystem 120 may be located.

Sensor 15 may be embedded in a body (e.g., housing 11) of subsystem 120, such as along a bottom surface that may be operative to contact a user, or can be positioned at any other desirable location. In some examples, different sensors can be placed in different locations inside or on the surfaces of subsystem 120 (e.g., some located inside housing 11 and some attached to an attachment mechanism (e.g., a wrist band coupled to a housing of a wearable device), or the like). In other examples, one or more sensors can be worn by a user separately as different parts of a single subsystem 120 or as different subsystems or devices. In such cases, the sensors can be configured to communicate with subsystem 120 using a wired and/or wireless technology (e.g., via communications component 14). In some examples, sensors can be configured to communicate with each other and/or share data collected from one or more sensors.

Power supply 17 can include any suitable circuitry for receiving and/or generating power, and for providing such power to one or more of the other components of subsystem 120. For example, power supply assembly 17 can be coupled to a power grid (e.g., when subsystem 120 is not acting as a portable device or when a battery of the device is being charged at an electrical outlet with power generated by an electrical power plant). As another example, power supply assembly 17 may be configured to generate power from a natural source (e.g., solar power using solar cells). As another example, power supply assembly 17 can include one or more batteries for providing power (e.g., when subsystem 120 is acting as a portable device). Subsystem 120 may also be provided with a housing 11 that may at least partially enclose one or more of the components of subsystem 120 for protection from debris and other degrading forces external to subsystem 120. Each component of subsystem 120 may be included in the same housing 11 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, subsystem 120 may include other components not combined or included in those shown or several instances of the components shown.

Processor 12 may be used to run one or more applications, such as an application 19 that may be accessible from memory 13 (e.g., as a portion of data 19*d*) and/or any other suitable source (e.g., from any other device in its system). Application 19 may include, but is not limited to, one or more operating system applications, firmware applications, communication applications (e.g., for enabling communication of data between devices), third party service applications, internet browsing applications (e.g., for interacting with a website provided by a third party subsystem), application programming interfaces ("APIs"), software development kits ("SDKs"), proprietary applications (e.g., a web application or a native application) for enabling subsystem 120 to interact with an online service and/or one or more other subsystems and/or the like, which may include applications for routing protocols, SDN modules based on OpenFlow, P4, or other network data plane programming standards, machine learning algorithms, network management functions, etc., any other suitable applications, such as applications for detecting and reacting to impact on a vehicle and/or detecting and reacting to positioning of travelers and components (e.g., seats, sun roof, etc.) of and within a vehicle (e.g., to adjust the position of any vehicle feature (e.g., sunroof or seat or passenger) and/or deploy an airbag or the like), and/or the like. For example, processor 12 may load an application 19 as an interface program to determine how instructions or data received via an input component of I/O component 16 or other component of subsystem 120 (e.g., sensor 15 and/or communications component 14) may manipulate the way in which information may be stored (e.g., in memory 13) and/or provided via an output component of I/O component 16 and/or communicated to another system device via communications component 14. As one example, application 19 may be a third party application that may be running on subsystem 120 (e.g., an application associated with the network of system 1) that may be loaded on subsystem 120 in any suitable manner, such as via an application market (e.g., using communications component 14), such as the Apple App Store or Google Play, or that may be accessed via an internet application or web browser (e.g., by Apple Safari or Google Chrome) that may be running on subsystem 120 and that may be pointed to a uniform resource locator ("URL") whose target or web resource may be managed by or otherwise affiliated with any suitable entity. Any subsystem may include any suitable special purpose hardware (e.g., hardware support of high-speed packet processing, hardware support of machine learning algorithms, etc.).

Subsystem 120 may be any portable, mobile, wearable, implantable, or hand-held electronic device configured to operate with system 1. Alternatively, subsystem 120 may not be portable during use, but may instead be generally stationary. Subsystem 120 can include, but is not limited to, a media player, video player, still image player, game player, other media player, music recorder, movie or video camera or recorder, still camera, other media recorder, radio, medical equipment, domestic appliance, smart appliance (e.g., smart door knob, smart door lock, etc.), transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device, boom box, modem, router, printer, kiosk, beacon, server, and any combinations thereof.

In some embodiments, processor 12 may be used to run one or more applications that may be accessible from memory 13 and/or from any other suitable source (e.g., an application from VMS subsystem 10 via an active internet connection or otherwise at and for use by a subsystem 100). Such an application may include, but is not limited to, one or more operating system applications, firmware applications, communication applications, internet browsing applications (e.g., for interacting with a website provided by VMS subsystem 10 for enabling a subsystem 100 to interact with an online service of VMS subsystem 10 (e.g., a VMSP)), VMS applications (e.g., a web application or a native application or a hybrid application that may be at least partially produced by VMS subsystem 10 for enabling a subsystem 100 to interact with an online service of VMS subsystem 10 (e.g., a VMSP)), or any other suitable applications. As one example, an application of a subsystem 100 may provide a user or a communicatively coupled device (e.g., control module 92) with the ability to interact with a vehicle management service or the VMSP of VMS subsystem 10, where such an application may be a third party application that may be running on a subsystem 100 (e.g., an application (e.g., software and/or firmware) associated with VMS subsystem 10 that may be loaded on subsystem 100 from VMS subsystem 10 or via an application market) and/or that may be accessed via an internet application or web browser running on subsystem 100 (e.g., processor 12) that may be pointed to a uniform resource locator ("URL") whose target or web resource may be managed by VMS subsystem 10 or any other remote subsystem. Each subsystem 100 may be a portable media device (e.g., a smartphone), a laptop computer, a tablet computer, a desktop computer, an appliance, a wearable electronic device, a virtual reality device, a dongle device, at least one web or network server (e.g., for providing an online resource, such as a website or native online application, for presentation on one or more other subsystems) with an interface for an administrator of such a server, and/or the like.

Some or all portions of VMS subsystem 10 may be operated, managed, or otherwise at least partially controlled by an entity (e.g., administrator) responsible for providing a vehicle management service to one or more clients or other suitable entities. VMS subsystem 10 may communicate with one or more subsystems 100 via communications network 50. Network 50 may be the internet or any other suitable network, such that when intercoupled via network 50, any two subsystems of system 1 may be operative to communicate with one another (e.g., a subsystem 100 may access information (e.g., from an application 19 or data 19d of VMS subsystem 10, as may be provided as a vehicle management service via processor 12 and communications component 14 of VMS subsystem 10) as if such information were stored locally at that subsystem 100 (e.g., in its memory component 13)).

Figure 1B:
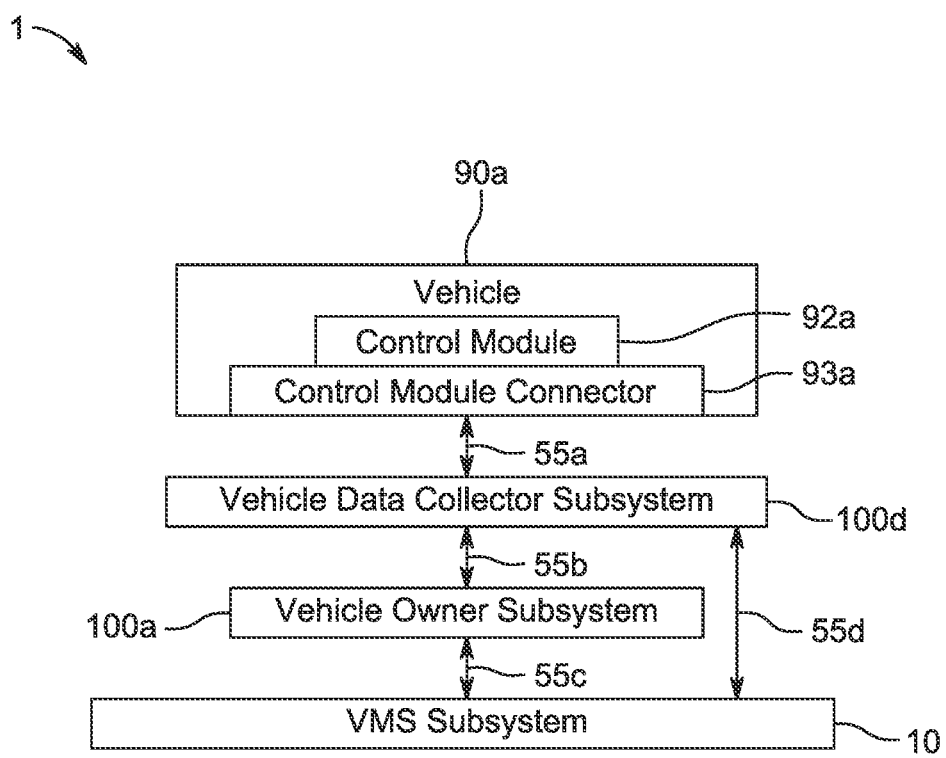
FIG. 1B is a more detailed schematic view of a portion of the system of FIG. 1.
Figure 1C:
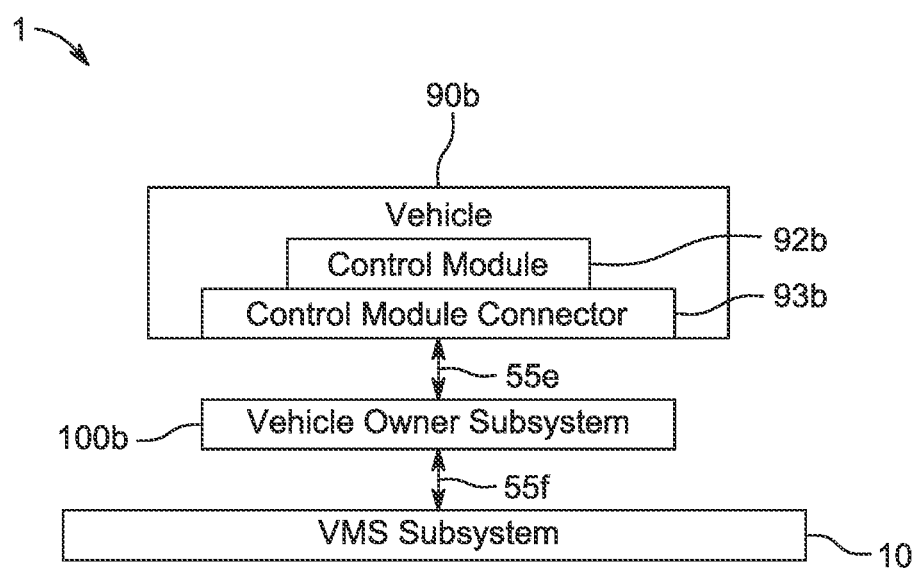
FIG. 1C is a more detailed schematic view of another portion of the system of FIG. 1.

Various clients and/or partners may be enabled to interact with VMS subsystem 10 for enabling the vehicle management services and the VMSP. For example, at least one vehicle owner subsystem of system 1 (e.g., each one of the one or more vehicle owner subsystems 100a-100c) may be any suitable subsystem (e.g., portable computer) operated by any suitable vehicle owner ("VO") that may own, rent, or otherwise have access to a vehicle (e.g., a respective one of the one or more vehicles 90a-90c (e.g., any suitable motor vehicle (e.g., car, truck, bus, motorcycle, etc.), railed vehicle (e.g., train, tram, etc.), watercraft (e.g., ship, boat, jet ski, etc.), aircraft (e.g., airplane, helicopter, drone, etc.), spacecraft, and/or the like)). At least one vehicle data collector subsystem of system 1 (e.g., each one of the one or more vehicle data collector subsystems 100d-100f) may be any suitable subsystem (e.g., dongle device) that may be communicatively coupled to a respective vehicle owner subsystem (e.g., via a network 50) and to a respective control module (e.g., via direct installation) of a respective vehicle (e.g., VDC subsystem 100d may be communicatively coupled to VO subsystem 100a and to CM 92a of vehicle 90a that may be owned by the operator of VO subsystem 100a, VDC subsystem 100e may be communicatively coupled to VO subsystem 100b and to CM 92b of vehicle 90b that may be owned by the operator of VO subsystem 100b, and VDC subsystem 100f may be communicatively coupled to VO subsystem 100c and to CM 92c of vehicle 90c that may be owned by the operator of VO subsystem 100c). For example, a VDC subsystem may be any suitable on-board diagnostics ("OBD") device that may be operative to be communicatively coupled with any suitable control module of any suitable vehicle (e.g., via any suitable OBD-II data link connector of a vehicle (e.g., via a physical connection or wireless path)) that may be operative to monitor any suitable data from an engine control unit and/or electronic control unit ("ECU") of the vehicle and/or from any other data source of the vehicle that may be made available (e.g., according to the OBD protocol), such as a powertrain control module ("PCM") or otherwise. A VDC subsystem may be operative to send one or more requests to the CM of a vehicle for one or more specific parameters using one or more specific parameter identification numbers ("PIDs") (e.g., according to the Society of Automotive Engineers ("SAE") standard J1979) and then the VDC subsystem may communicate any received parameter data from the vehicle to a VO subsystem that may be communicatively coupled to the VDC subsystem (e.g., via any suitable wired or wireless communication protocol). For example, as shown in FIG. 1B, VDC subsystem 100d may be communicatively coupled to any suitable control module connector 93a via any suitable communications path 55a, which may be a direct physical connection between connector 93a and a connector of VDC subsystem 100d (e.g., a male connector of an I/O component 16 of VDC subsystem 100d may physically mate with a female control module connector 93a (e.g., any suitable OBD-II data link connector)), where control module connector 93a may be communicatively coupled to one, some, or all suitable control modules or data sources (e.g., control module 92a) of vehicle 90a, while VDC subsystem 100d may be communicatively coupled to VO subsystem 100a via any suitable communications path 55b (e.g., any suitable wired or wireless communications path using any suitable communications protocol (e.g., Bluetooth between a communications component 14 of VDC subsystem 100d and a communications component 14 of VO subsystem 100a), while VO subsystem 100a may be communicatively coupled to VMS subsystem 10 via any suitable communications path 55c (e.g., any suitable wired or wireless communications path (e.g., of network 50 of FIG. 1) using any suitable communications protocol). Alternatively or additionally, as shown in FIG. 1B, VDC subsystem 100d may be communicatively coupled to VMS subsystem 10 via any suitable communications path 55d (e.g., any suitable wired or wireless communications path (e.g., of network 50 of FIG. 1) using any suitable communications protocol (e.g., any suitable long-range communications protocol between a communications component 14 of VDC subsystem 100d and a communications component 14 of VMS subsystem 10 (e.g., using a low power communications component and/or any suitable telemetry functionality)) without VO subsystem 100a as an intermediary. Additionally or alternatively, in some embodiments, a VO subsystem may be configured to communicate directly with a CM of a vehicle without the need for a distinct intermediary VDC subsystem. For example, as shown in FIG. 1C, VO subsystem 100*b* may be communicatively coupled to any suitable control module connector 93*b* via any suitable communications path 55*e*, which may be a direct wired connection between connector 93*b* and a connector of VO subsystem 100*b* (e.g., a connector of an I/O component 116 of VO subsystem 100*b* may be communicatively coupled to a first connector of a cable of communications path 55*e* and a second connector of such a cable may be communicatively coupled with control module connector 93*b* (e.g., any suitable OBD-II data link connector)), where control module connector 93*b* may be communicatively coupled to one, some, or all suitable control modules or data sources (e.g., control module 92*b*) of vehicle 90*b*, while VO subsystem 100*b* may be communicatively coupled to VMS subsystem 10 via any suitable communications path 55*f* (e.g., any suitable wired or wireless communications path (e.g., of network 50 of FIG. 1) using any suitable communications protocol). In some embodiments, communications path 55*e* may be a wireless communications path between control module 92*b* and VO subsystem 100*b* (e.g., a wireless (e.g., Bluetooth) communication path between a communications component 14 of VO subsystem 100*b* and a communications component of control module 92*b* of vehicle 90*b*), such that a data connection may be facilitated directly between a user's portable electronic device and a computer of a vehicle directly through a wireless connection.

Each subsystem 100 of system 1 (e.g., each one of subsystems 100*a*-100*f*) may be operated by any suitable entity for interacting in any suitable way with VMS subsystem 10 (e.g., via network 50) for deriving value from and/or adding value to a service of the VMSP of VMS subsystem 10. For example, a particular subsystem 100 may be a server operated by a client/partner entity that may receive any suitable data from VMS subsystem 10 related to any suitable vehicle management enhancement of the VMSP provided by VMS subsystem 10 (e.g., via network 50). Additionally or alternatively, a particular subsystem 100 may be a server operated by a client/partner entity that may upload or otherwise provide any suitable data to VMS subsystem 10 related to any suitable vehicle management service of the VMSP provided by VMS subsystem 10 (e.g., via network 50).

Figure 2:
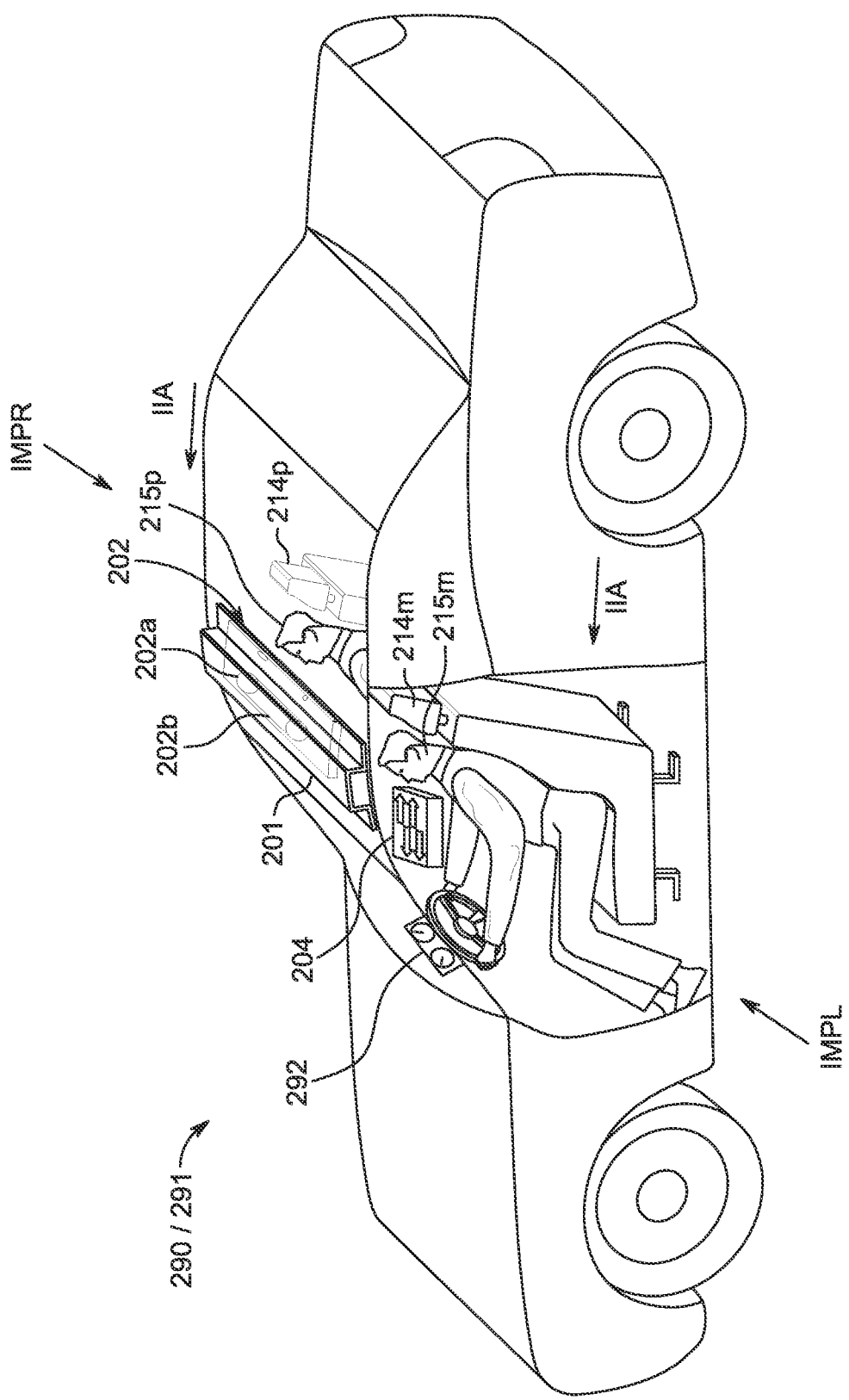
FIG. 2 is a perspective view of a vehicle with an airbag deployment system in accordance with some embodiments of the disclosure.
Figure 2A:
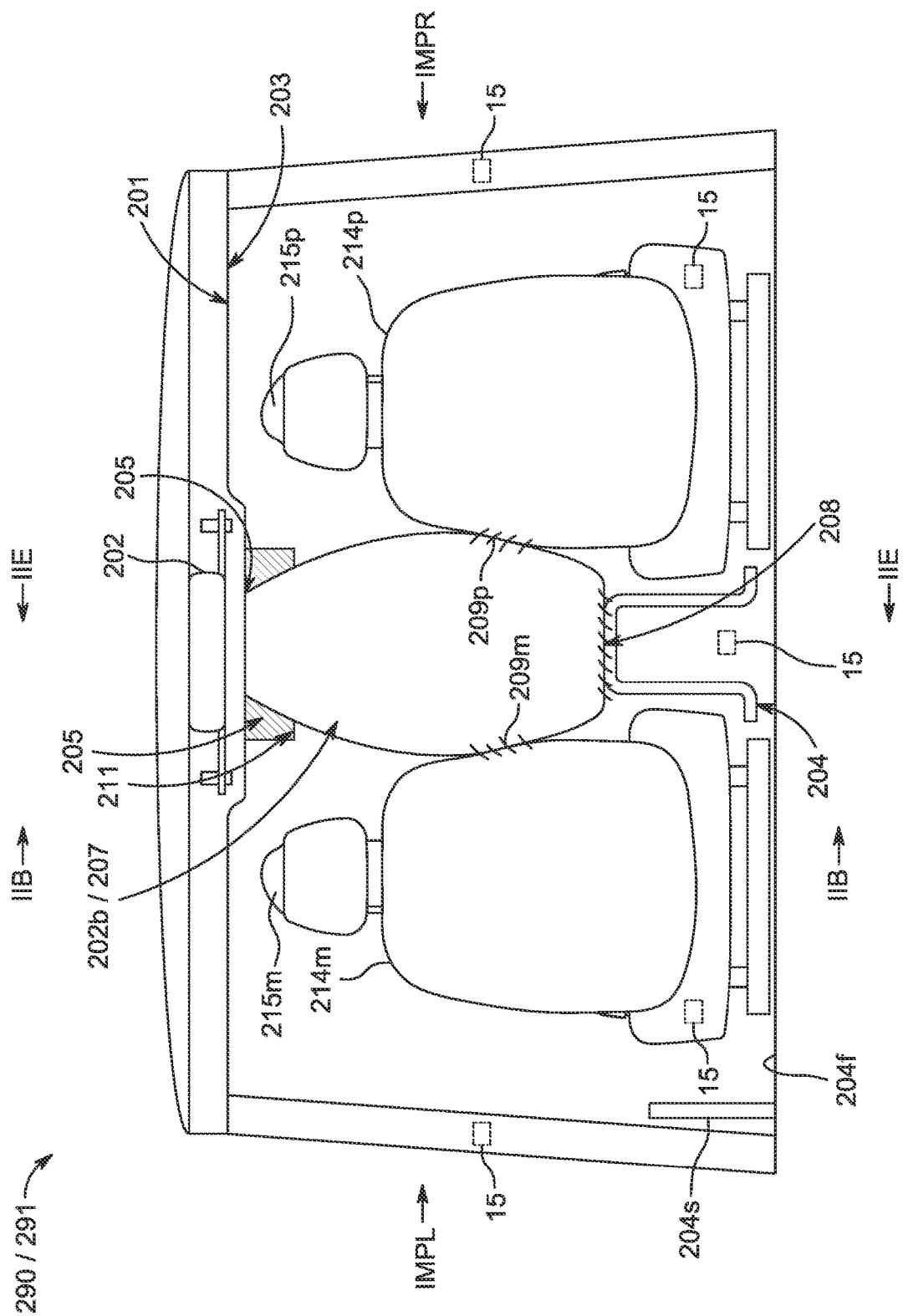
FIG. 2A is a rear view of a portion of the vehicle of FIG. 2, taken from line IIA-IIA of FIG. 2.
Figure 2B:
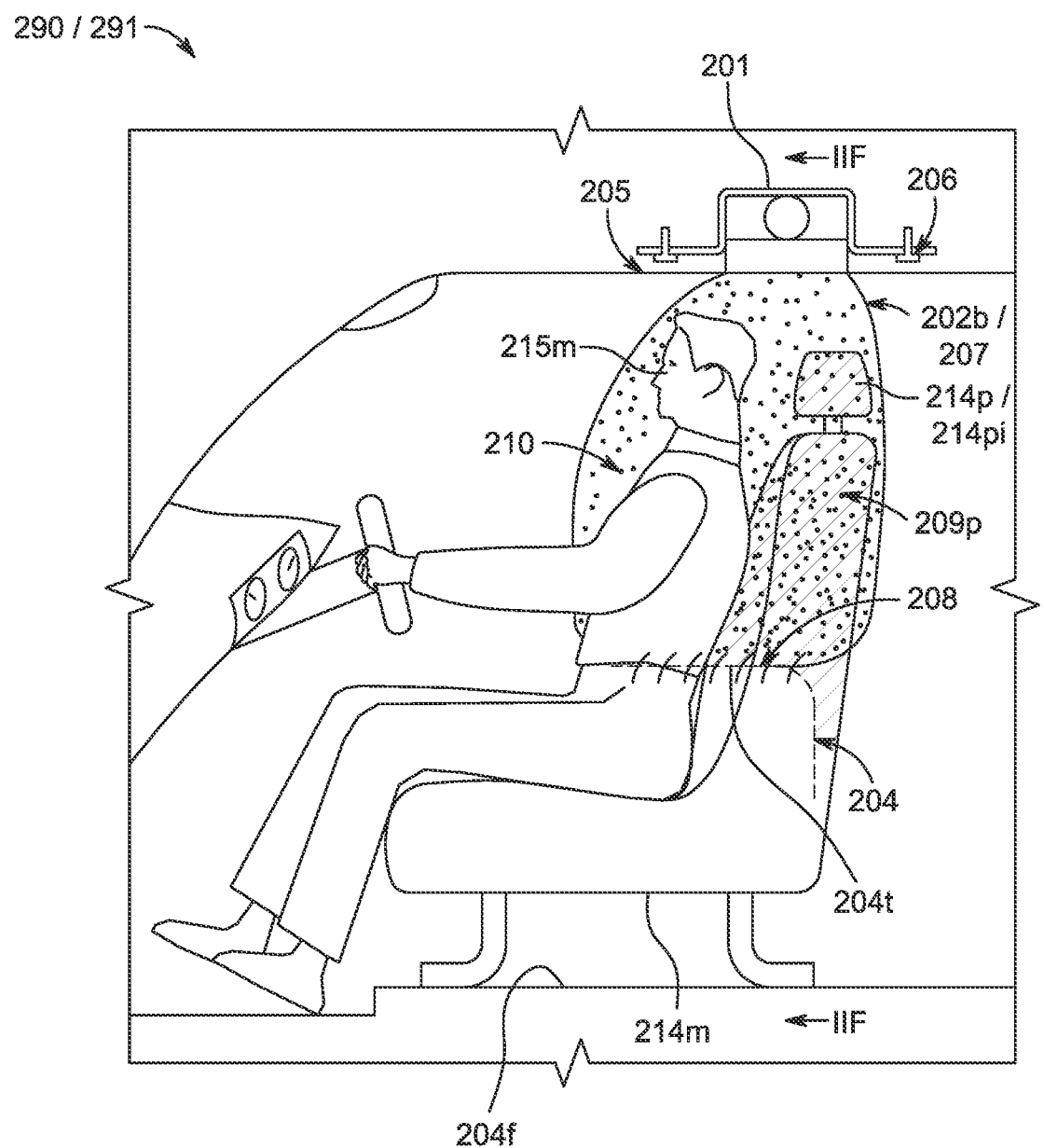
FIG. 2B is a side view of a portion of the vehicle of FIGS. 2 and 2A, taken from line IIB-IIB of FIG. 2A.
Figure 2C:
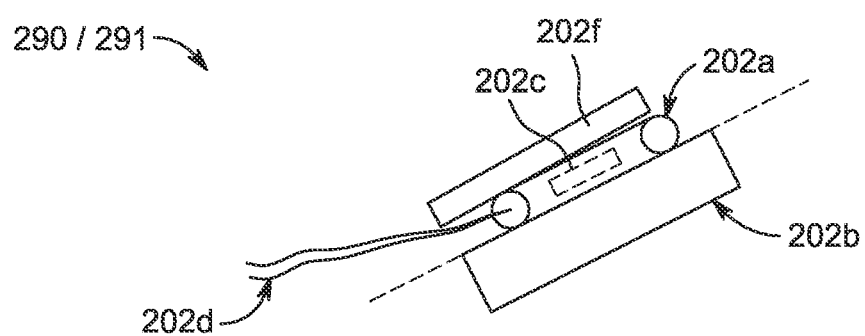
FIG. 2C is a view of at least a portion of the airbag deployment system of FIG. 2, in a non-deployed state.

FIGS. 2 and 2A-2D show an illustrative vehicle 290 that may include an airbag deployment system 291, in accordance with some embodiments of the disclosure. Vehicle 290 may be any suitable vehicle, which may be similar to any vehicle 90 (e.g., vehicles 90*a*-90*c*) described herein. As shown in FIGS. 2, 2A, and 2B, in some embodiments, vehicle 290 may be any suitable automobile with one or more seats, which may include a main seat 214*m* (e.g., a driver seat if the vehicle is able to be driven) for a main traveler 215*m* and a passenger seat 214*p* for a passenger traveler 215*p*, as well as any suitable center console 204 that may be positioned at least partially between seats 214*m* and 214*p*. Center console 204 may provide any suitable component(s) of a vehicle, including, but not limited to, glove compartment, stick shift, emergency brake, cup holder(s), electronic(s), arm rest(s), and/or the like, or may instead provide a floor surface of the vehicle (e.g., floor surface 204*f*) and/or a top surface of a middle seat. Airbag deployment system 291 may include any suitable airbag control module(s) 292, which may be similar to any control module 92 described herein (e.g., inclusive of any suitable sensors 15 (e.g., impact detection sensors, vehicle component positioning sensors (e.g., relative positioning of seats 214), etc.), ECUs, and/or the like), and any suitable controllable airbag subsystem(s) 202 that may be controllable by control module(s) 292.

As shown, airbag subsystem 202 of airbag deployment system 291 may include a gas or any other suitable inflator or fluid generation unit 202*a*, a cushion 202*b* (e.g., a foldable and inflatable cushion), and a wire harness 202*d* that may be used to carry a trigger current or any suitable control signal (e.g., as a bus 18 from control module 292), where gas generation unit 202*a* may include any suitable gas generating powder (e.g., explosive) 202*c* that may be utilized by unit 202*a* to fill and inflate and deploy cushion 202*b* (e.g., using any suitable fluid(s), such as air and/or the like). For example, FIGS. 2 and 2C may show airbag deployment system 291 with cushion 202*b* in a non-deployed (e.g., folded or compact) state, while FIGS. 2A, 2B, and 2D may show airbag deployment system 291 with its cushion 202*b* in a deployed (e.g., inflated or expanded) state as deployed airbag 207. For example, cushion 202*b* may be strategically designed and folded in any suitable way(s) in order to be retained in a particular limited space prior to deployment and to be inflated to have any suitable desired size and shape during and after deployment for efficient and effective user protection when deployed. Once any suitable sensor(s) of airbag control module 292 detects any suitable airbag deployment event (e.g., a side impact crash), airbag control module 292 may be configured to provide any suitable signal(s) to airbag subsystem 202 for deployment (e.g., an ECU of module 292 may detect any suitable event(s) from sensor(s) 15 and may generate any suitable control signal(s) for communication (e.g., along wire harness 202*d*) to subsystem 202 (e.g., to unit 202*a*) for deploying (e.g., inflating) cushion 202*b* in any suitable manner from its folded state to its deployed state as deployed airbag 207 or any state therebetween). For example, upon receiving such a signal, gas generation unit 202*a* may generate gas by flash burning explosive, whereby this gas may create outward pressure through airbag cushion 202*b*, and, once sufficient pressure is built, an airbag tear seam 205 (e.g., in headliner 203) may break (e.g., in three places), whereby cushion 202*b* may further inflate like a balloon to its deployed state as deployed airbag 207. Moreover, an airbag deployment living hinge 206 (e.g., a nonbreaking element) may be provided to enable such deployment and/or an airbag cover lid 211 may be utilized for enabling deployment. For example, this may be mounted in the headliner and may break on three sides where a fourth side may be configured to act as a living hinge such that no pieces of the holding apparatus may fly away from the headliner and injure a traveler. The inflation of the cushion may break open just holding apparatus.

Figure 2D:
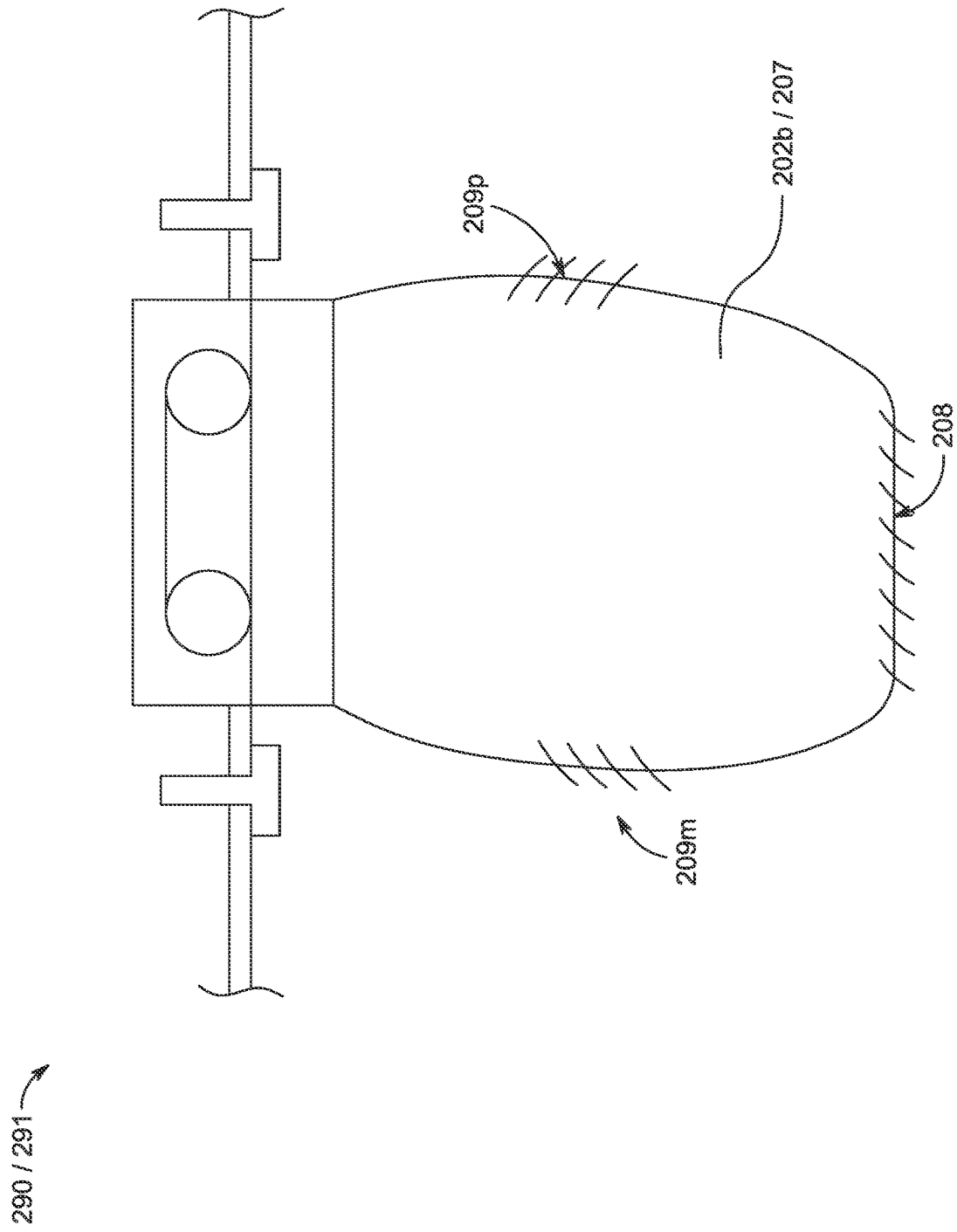
FIG. 2D is a view of the airbag deployment system of FIG. 2C, in a deployed state.
Figure 2E:
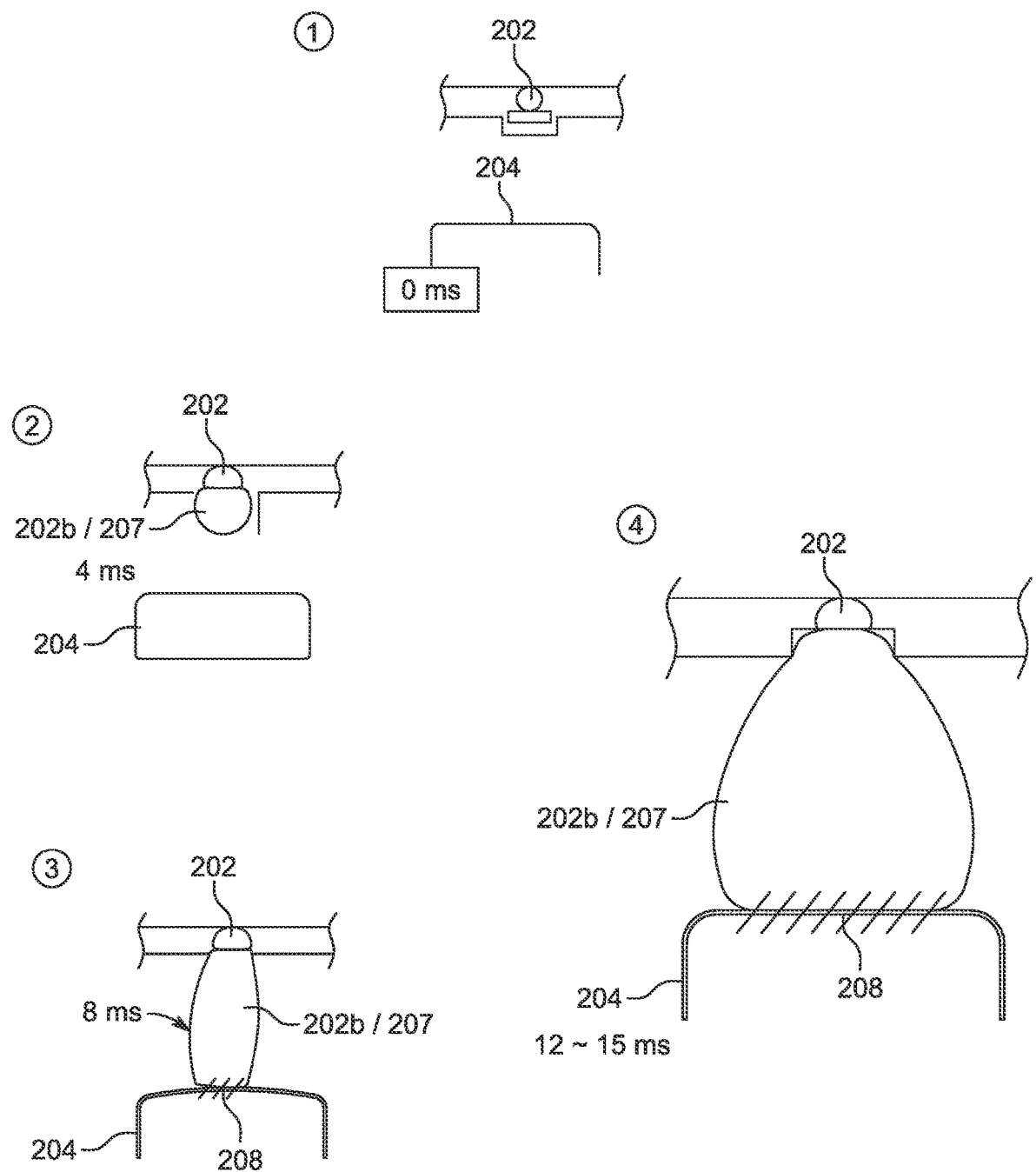
Figure 2F:
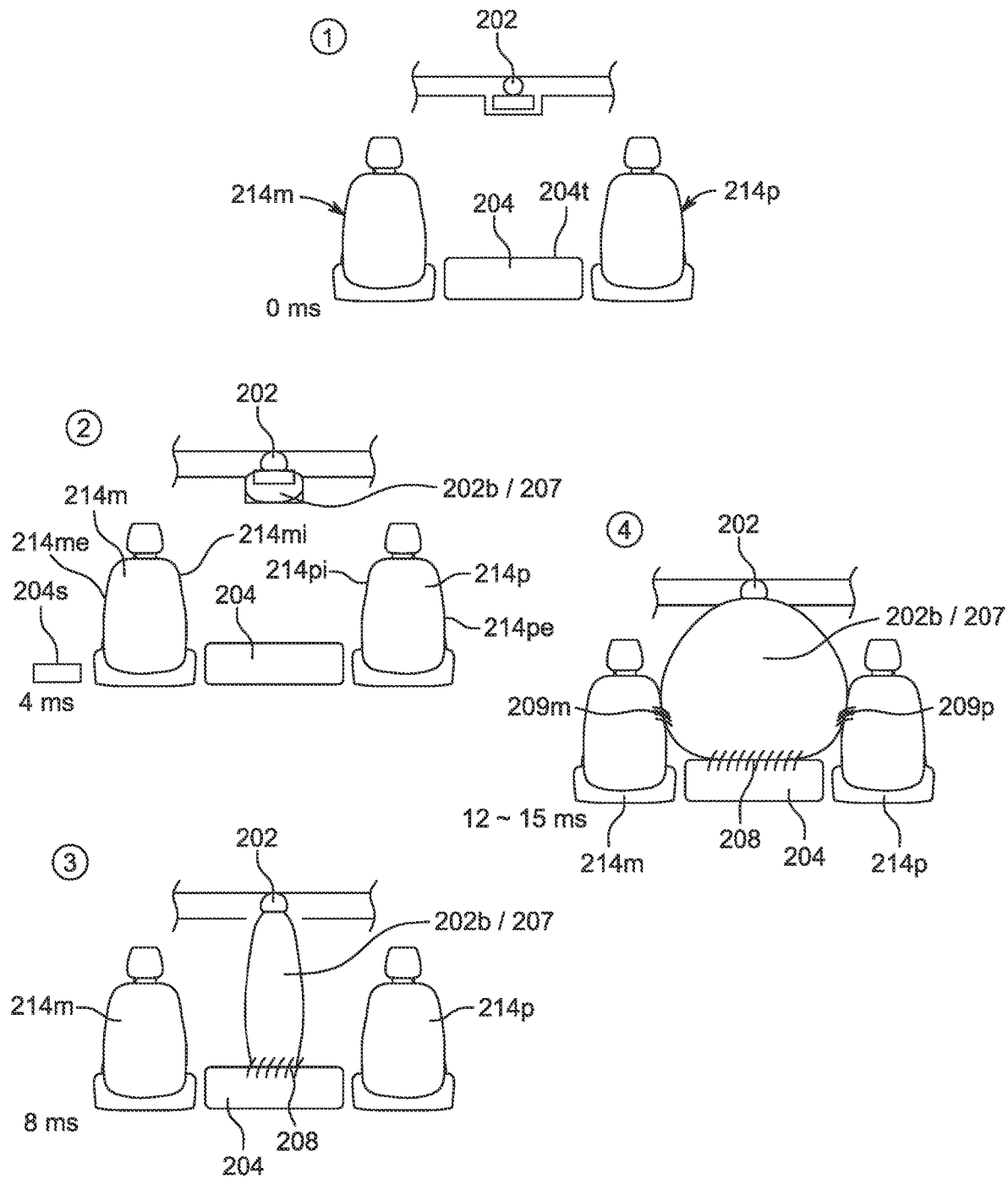
Figure 3:
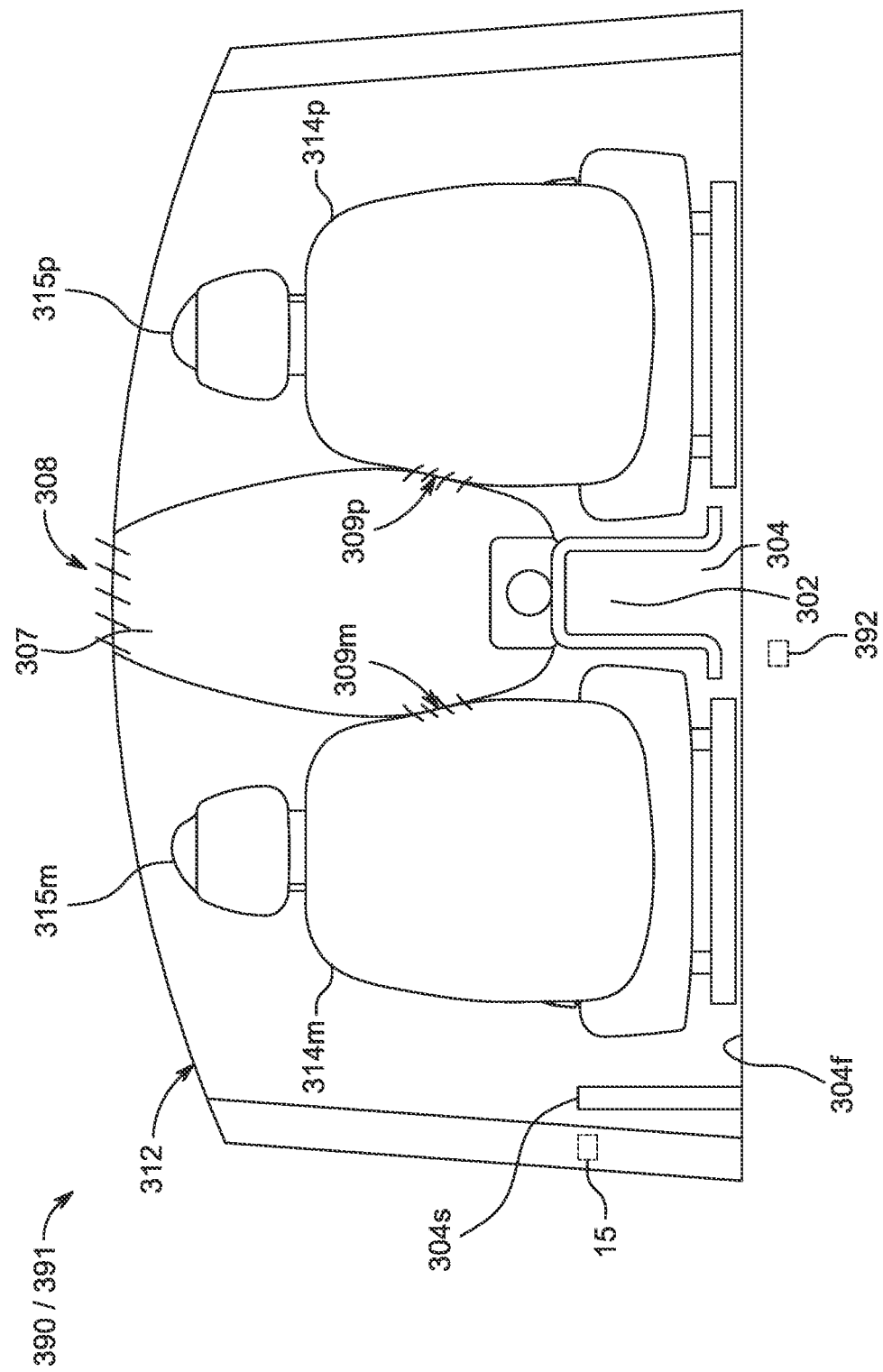
FIG. 3 is a rear view, similar to FIG. 2A, of another vehicle with another airbag deployment system in accordance with some embodiments of the disclosure.
Figure 4:
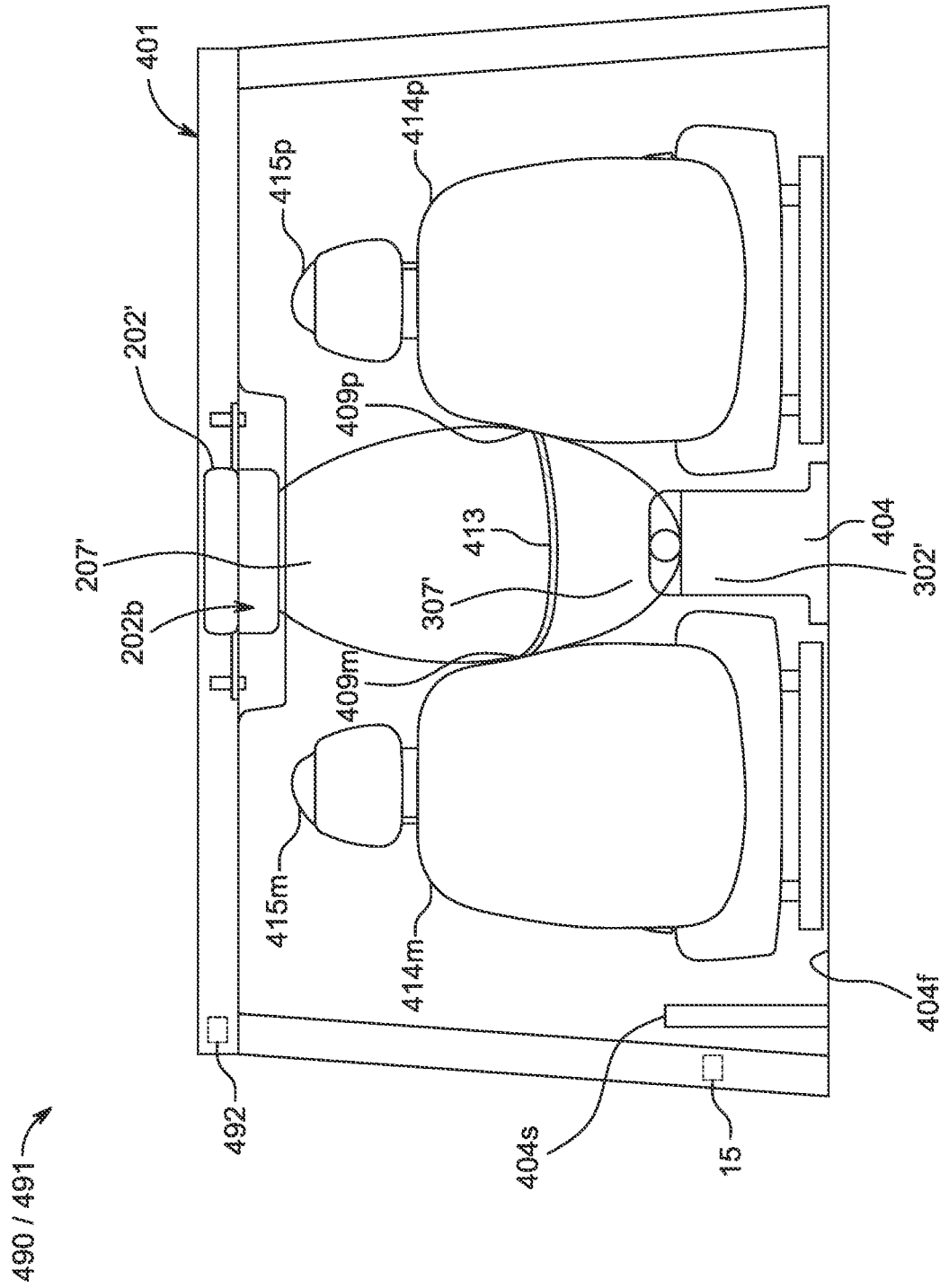

When an airbag is positioned in or mounted on a seat, such an airbag may be tethered only on one side (e.g., at the seat), which may offer a cantilever support (e.g., to an occupant's head). When deployed, such a seat airbag may only have one tether surface (e.g., a user's head but not a useful and/or consistent opposing surface (e.g., the only anchor point may be in the seat itself). However, by providing a downward deploying airbag to a space in the center of the vehicle (e.g., front center of the vehicle between seats 214*p* and 214*m*), due to inertia during a side impact crash (e.g., in the direction of arrow IMPL and/or arrow IMPR of FIG. 2A), an occupant's head may move towards the airbag and eventually bump into the airbag. The presence of such an airbag may allow energy from the head to be absorbed into the deployed airbag. This in turn may stop excessive stress build in the occupant's neck. For example, as shown in FIGS. 2, 2A, and 2B, vehicle 290 may include any suitable cross bar beam 201 or any other suitable vehicle ceiling or sunroof or other frame component that may extend over a space between seats 214*m* and 214*p* (e.g., in a direction from the left to the right side of the vehicle frame (e.g., as shown) or in a direction from the front to the rear of the vehicle frame). Airbag deployment system 291 may be coupled at least partially to a roof or such a cross bar beam 201 or any other suitable portion thereof (e.g., cushion 202*b* may be mounted at least partially on and/or within roof cross beam 201 or any suitable headliner 203 that may adorn beam 201). As shown in FIGS. 2A, 2B, and 2D, deployed airbag 207 may be configured to expand into space between seats 214*m* and 214*p* and downward (e.g., downward such that a portion of airbag 207 contacts and pushes against any suitable opposing surface(s) (e.g., downward such that a portion of airbag 207 contacts and pushes against any suitable surface(s) (e.g., top surface 204*t*) of center console 204 (e.g., thereby creating a pressure zone 208))). Airbag 207 may be configured to build pressure on seats 214 and console 204. For example, airbag 207 may create pressure zones 209*m* and 209*p* on respective seats 214*m* and 214*p* and/or pressure zone 208 on center console 204. For example, cushion 202*b* may be strategically designed and folded in any suitable way(s) in order to be retained in a particular limited space prior to deployment and to be inflated to have any suitable desired size and shape during deployment and after full deployment for efficient and effective user protection when deployed. For example, as shown in FIGS. 2E1 and 2F1 prior to deployment (e.g., 0 ms (e.g., prior to deployment)), as shown in FIGS. 2E2 and 2F2 just after initial deployment (e.g., at 4 ms after deployment initiates (e.g., during deployment)), as shown in FIGS. 2E3 and 2F3 later during deployment (e.g., at 8 ms after deployment initiates (e.g., during deployment)), and/or as shown in FIGS. 2E4 and 2F4 when deployment completes (e.g., at 12-15 ms after deployment initiates (e.g., at completion of deployment)), cushion 202*b*/207 may be deployed downward such that it may first create one or more pressure zones 208 on center console 204 prior to expanding further outward to create one or more pressure zones 209 on one or more vehicle seats (e.g., one or more pressure zones 209*m* on seat 214*m* and/or one or more pressure zones 209*p* on seat 214*p*, etc.). Therefore, the cushion and deployment mechanism(s) may be configured to promote the airbag being deployed to interact with the center console before it also interacts with one, some, or any vehicle seats. For example, the cushion may be sized, shaped, and/or folded prior to deployment in such a way that during deployment the cushion may unfold downward to promote interaction with the center console before at least partially unfolding or expanding outwardly to promote interaction with any seat(s). Additionally or alternatively, one or more inflation techniques (e.g., burst(s) of inflation fluid) may be controlled to promote such behavior or any other suitable deployment behavior.

One or more portions or the entirety of an external surface of airbag 207 may be provided with (e.g., made of or coated with) a material that may be tuned to ensure a sufficient coefficient of friction for enabling stabilization on and/or retention to any suitable impact or reaction surface(s) (e.g., a side surface of a seat 214 at a pressure zone 209 and/or a top surface of center console 204 at a pressure zone 208, etc.) when airbag 207 is deployed and expanded during a vehicle crash or any other suitable airbag deployment event, which may promote a more efficient and/or effective airbag deployment and safety process during the event. Additionally or alternatively, one or more portions or the entirety of an external surface (e.g., side surface) of one or both seats 214 may be provided with (e.g., made of or coated with) a material that may be tuned to ensure a sufficient coefficient of friction for enabling stabilization on and/or retention to any suitable airbag surface (e.g., a surface of airbag 207 at a pressure zone 209) when airbag 207 is deployed and expanded, which may promote a more efficient and/or effective airbag deployment and safety process. Additionally or alternatively, one or more portions or the entirety of an external surface (e.g., top surface) of center console 204 may be provided with (e.g., made of or coated with) a material that may be tuned to ensure a sufficient coefficient of friction for enabling stabilization on and/or retention to any suitable airbag surface (e.g., a surface of airbag 207 at a pressure zone 208) when airbag 207 is deployed and expanded, which may promote a more efficient and/or effective airbag deployment and safety process. For example, such a material or coating may be tuned based on prototype parts to ensure proper pressure build and airbag to offer sufficient lateral force for occupant head energy absorption (e.g., a coefficient of friction may be high and of specific value so that the airbag cushion may not slide off from the center console surface and/or from a side seat surface while the airbag is deployed in order to promote robust protection). Any suitable material(s) and/or coefficient(s) of friction thereof may be calculated or otherwise determined by any suitable energy absorption requirements (e.g., sideways load on a deployed airbag). As the airbag may not be a rigid member, any suitable computer-aided engineering may be carried out to check what is a sideways force on an interface zone 208 and/or a fore/aft force on a zone 209. Any suitable type(s) of material(s) and/or coating(s) may be used to provide an airbag and/or center console surface and/or side seat surface(s) and/or any other surface(s) that may interact with an airbag for creating pressure zones or interaction zones or retention zones to provide any suitable friction therebetween (e.g., at one or more of zones 208 and/or 209). High friction of coefficient plastics may be used, including, but not limited to, rubber, neoprene, and/or the like. In some embodiments, one or more additives may be provided so that a material may maintain a coefficient of friction for long periods of time (e.g., 10-15 years (e.g., life of vehicle)). In some embodiments, a hook-and-loop fastener assembly (e.g., Velcro™) may be provided on opposing surfaces (e.g., hooks on exterior surface portion(s) of airbag and loops on exterior surface portion(s) of a center console and/or seat(s) and/or any other surface(s) that may interact with an airbag for creating pressure zones or interaction zones or retention zones, and/or loops on exterior surface portion(s) of airbag and hooks on exterior surface portion(s) of a center console and/or seat(s) and/or any other surface(s) that may interact with an airbag for creating pressure zones or interaction zones or retention zones) for promoting retention or anchoring or desired airbag placement when deployed. Additionally or alternatively, a magnet assembly may be provided on opposing surfaces (e.g., one polarity magnet(s) on exterior surface portion(s) of airbag and other polarity magnet(s) on exterior surface portion(s) of a center console and/or seat(s) and/or any other surface(s) that may interact with an airbag for creating pressure zones or interaction zones or retention zones) for promoting retention or anchoring or desired airbag placement when deployed. Any other suitable attraction/retention assemblies may be alternatively or additionally employed. A vent may be provided to adjust internal pressure of the airbag but may be limited in use so as not to reduce a pressure induced grip between the airbag and center console and/or seat(s) and/or any other surface(s) that may interact with an airbag for creating pressure zones or interaction zones or retention zones. As strong and/or as robust an attraction and/or retention force as possible may be designed between the airbag and one or more vehicle retention surfaces (e.g., center console, roof, seat(s), floor, etc.) in order to promote one or more strong additional anchors for an airbag when deployed.

Therefore, if vehicle 290 is impacted by a crash event in the direction of arrow IMPL (e.g., if the vehicle is hit on the side of main seat 214m and main traveler 215m (e.g., a crash event against an external surface of a main vehicle door (not shown in FIG. 2))), then the inertia of passenger traveler 215p may push passenger traveler 215p towards the center of the vehicle in the direction of arrow IMPR (e.g., towards the interior side surface 214mi of main seat 214m that may be facing the interior side surface 214pi of seat 214p), such that the passenger traveler's head and/or shoulder or otherwise may impact an impact zone 210 of deployed airbag 207 (e.g., a portion of airbag 207 adjacent pressure zone 209p). Additionally or alternatively, if vehicle 290 is impacted by a crash event in the direction of arrow IMPR (e.g., if the vehicle is hit on the side of passenger seat 214p and passenger traveler 215p (e.g., a crash event against an external surface of a passenger vehicle door)), then the inertia of main traveler 215m may push main traveler 215m towards the center of the vehicle in the direction of arrow IMPL (e.g., towards the interior side surface 214pi of passenger seat 214p that may be facing the interior side surface 214mi of seat 214m), such that the main traveler's head and/or shoulder or otherwise may impact an impact zone 210 of deployed airbag 207 (e.g., a portion of airbag 207 adjacent pressure zone 209m) (e.g., as may be shown in FIG. 2B, where an upper portion of seat 214m may not be shown, such that an upper portion of seat 214p and pressure zone 209p may be shown beyond airbag 207). A crash event impact may be detected by sensors (e.g., sensors 215) of airbag control module 292 and processed to immediately generate a signal for rapid deployment of airbag 207 of airbag subsystem 202 (e.g., downward deployment for interacting with a reaction surface (e.g., top surface 204t) on center console 204 and/or with a reaction surface on one or both of seats 214 (e.g., surface 214pi and/or surface 214mi)). In just some embodiments, a fully deployed airbag may be about 120 liters or 500 liters, although any other suitable volume may be provided and may vary based on size of vehicle and/or implementation. A vent may be provided to enable valved release of certain fluid (e.g., as may be represented by the dots of FIG. 2) from an airbag (e.g., once a user may impact the airbag).

One or more sensors of airbag control module 292 may be configured to detect any positioning of any suitable vehicle components, such as seats 214 and/or console 204 and/or travelers 215 and/or the like in order to further protect the traveler(s). For example, if the relative positions of seat 214m and 214p are such that their sides (e.g., surfaces 214mi and 214pi) are not adjacent one another (e.g., if seat 214m is positioned forwardly close to the dashboard (e.g., for short main travelers 215m) and if seat 214p is reclined backwardly (e.g., for sleeping passenger travelers 215p), such that the side of one or both seats may not be positioned for providing an adequate impact or reaction surface for airbag 207, then control module 292 may be configured to detect this and adjust the deployment of airbag 207 (e.g., adjust the speed or pressure or angle or otherwise of deployment) and/or adjust the position of center console 204 (e.g., to raise or lower a top surface facing the airbag) and/or adjust any other suitable component(s) of the vehicle to promote a more robust safety application for the airbag deployment). In some embodiments, an airbag subsystem may include two or more inflators for a particular airbag and/or may include multiple airbags and/or may include an adjustable deployment platform (e.g., platform 202f that may be controlled by any suitable motor(s) or otherwise to adjust the angle and/or orientation or otherwise of the airbag to be deployed with respect to any other surface(s) of the vehicle (e.g., in any one or more of six degrees of freedom and/or angles of rotation)) in order to intelligently adjust the deployment of one or more airbags based on any suitable detected characteristics. For example, such a deployment platform 202f may move the cushion or subsystem 202 or adjust an angle and/or deployment force for deploying the airbag based on the relative location or position of the center console 204 and/or of one or more seats 214 (e.g., a launch angle may be adjusted and/or initial launch position of airbag may be adjusted depending on location of detected impact (e.g., crash) and/or location of center console and/or seat(s) (e.g., if center console and/or seat(s) are movable or variable in position during use of a vehicle)). For example, if side vehicle impact occurs on passenger side of car, then a downward deploying airbag may be more useful in protecting a particular one of the driver and passenger and may angle the deployment of the airbag towards that particular traveler. Any suitable application 19 may be programmed in any suitable ways to process any suitable detected positioning of seat(s) and/or center console and/or crash impact event to determine any suitable adjustment(s) to airbag deployment and/or seat repositioning and/or center console repositioning for better protecting one or more passengers during airbag deployment. Therefore, when a vehicle is detected as experiencing a crash event (e.g., a side crash event), an airbag may be deployed away from a ceiling of the vehicle towards a floor of the vehicle. During deployment, the airbag may find a reaction surface (e.g., a pressure zone) on a console or floor and/or on a seat, where the interaction may be configured to create a sufficient holding force to absorb a traveler's impact (e.g., a traveler's head's impact) on the airbag. A neck force of the traveler may not exceed legal limits as impact force may be absorbed by the airbag.

In some other embodiments, rather than deploying an airbag downwardly from a roof towards a center console or side console (e.g., a side console between an exterior seat side and an interior vehicle door side (e.g., side console 204s)) or floor of the vehicle for positioning the deployed airbag between two adjacent traveler seats or along the side of at least one traveler seat (e.g., an exterior side surface 214me of seat 214m or an exterior side surface 214pe of seat 214p), an airbag deployment system may include a controllable airbag subsystem operative to deploy an airbag upwardly from a middle bench seat or center console or side console or floor towards a roof of the vehicle for positioning the deployed airbag between two adjacent traveler seats or along the side of at least one traveler seat. For example, as shown in FIG. 3, a vehicle 390 and airbag deployment system 391 may be provided, where vehicle 390 may be any suitable automobile with one or more seats, which may include a main seat 314m (e.g., a driver seat if the vehicle is able to be driven) for a main traveler 315m and a passenger seat 314p for a passenger traveler 315p, as well as any suitable center console 304 that may be positioned at least partially between seats 314m and 314p and/or any suitable side console 304s that may be positioned between an exterior side surface of a seat and an interior vehicle door side and/or any suitable floor surface 304f. Center console 304 may provide any suitable component(s) of a vehicle, including, but not limited to, glove compartment, stick shift, emergency brake, cup holder(s), electronic(s), arm rest(s), and/or the like, or may instead provide a floor surface of the vehicle and/or a top surface of a middle seat. Vehicle 390 may include any suitable ceiling or roof or frame feature 312 (e.g., glass roof, moon roof, retractable roof, cross bar beam, etc.) that may extend over a space between the seats and/or over console 304 and/or console 304s and/or any other suitable portion of floor surface 304f. Airbag deployment system 391 may include any suitable airbag control module(s) 392, which may be similar to any control module 92 described herein (e.g., inclusive of any suitable sensors 15 (e.g., impact detection sensors, vehicle component positioning sensors (e.g., relative positioning of seats 314), etc.), ECUs, and/or the like), and any suitable controllable airbag subsystem(s) 302 that may be controllable by control module(s) 392. When airbag 307 of airbag subsystem 302 is deployed, it may deploy upwardly from console 304 (and/or console 304s and/or floor 304f) towards roof 312. For example, airbag 307 may create pressure zones 309m and 309p on respective seats 314m and 314p and/or pressure zone 308 on roof 312 with any suitable reaction surfaces and/or coefficient of friction materials (e.g., as described with respect to vehicle 290). Like with subsystem 202, airbag subsystem 302 may be configured to promote interaction of the airbag with the roof or opposing interaction surface(s) prior to interaction with any side seat surface(s). Airbag subsystem 302 may be incorporated into any suitable center console 304 and/or console 304s and/or floor 304f in any suitable manner. For example, such a subsystem may be the same or substantially similar to any suitable instrument panel mounted passenger airbags, but upward deploying and with the various characteristics described herein with respect to subsystem 202 and/or any other airbag subsystem(s) (e.g., pressure zones, etc.). One or more sensors 15 of airbag control module 392 may be configured to detect any positioning (e.g., relative positioning) of any suitable vehicle components, such as seats 314 and/or console 304 and/or console 304s and/or floor 304f and/or travelers 315 and/or a retractable sunroof of roof 312 and/or the like in order to further protect the traveler(s). For example, if the relative position of seat 314m and 314p are such that their sides are not adjacent one another (e.g., if seat 314m is positioned forwardly close to the dashboard (e.g., for short main travelers) and if seat 314p is reclined backwardly (e.g., for sleeping passenger travelers), such that the side of one or both seats may not be positioned for providing an adequate impact or reaction surface for airbag 307, then control module 392 may be configured to detect this and adjust the deployment of airbag 307 (e.g., adjust the speed or pressure or angle or otherwise of deployment) and/or adjust the position of center console 304 (e.g., to raise or lower a top surface facing the roof) and/or adjust any other suitable component(s) of the vehicle to promote a more robust safety application for the airbag deployment). Alternatively or additionally, if a retractable sunroof is determined to be open or a roof portion opposite the center console or other suitable airbag deploying vehicle portion is determined to be missing, the deployment of the airbag may be adjusted (e.g., to add more pressure or to be aimed towards one or both seats or a front dashboard) and/or the sunroof may be quickly closed or some other substitute surface immediately provided to aid in effective airbag deployment (e.g., using any suitable application 19). Therefore, when a vehicle is detected as experiencing a crash event (e.g., a side crash event), an airbag may be deployed away from a floor of the vehicle towards a ceiling of the vehicle. During deployment, the airbag may find a reaction surface (e.g., a pressure zone) on a ceiling and/or on a seat, where the interaction may be configured to create a sufficient holding force to absorb a traveler's impact (e.g., a traveler's head's impact) on the airbag. A neck force of the traveler may not exceed legal limits as impact force may be absorbed by the airbag.

In some other embodiments, an airbag deployment system may include a controllable airbag subsystem operative to deploy a first airbag downwardly from a vehicle roof and a second airbag upwardly from a center console or other suitable console or floor or middle bench seat towards a roof of the vehicle for positioning the deployed airbags between two adjacent traveler seats or along the side of at least one traveler. For example, as shown in FIG. 4, a vehicle 490 and airbag deployment system 491 may be provided, where vehicle 490 may be any suitable automobile with one or more two seats, which may include a main seat 414m (e.g., a driver seat if the vehicle is able to be driven) for a main traveler 415m and a passenger seat 414p for a passenger traveler 415p, as well as any suitable center console 404 that may be positioned at least partially between seats 414m and 414p and/or any suitable side console 404s. Center console 414 may provide any suitable component(s) of a vehicle, including, but not limited to, glove compartment, stick shift, emergency brake, cup holder(s), electronic(s), arm rest(s), and/or the like, or may instead provide a floor surface 404f of the vehicle and/or a top surface of a middle seat. Vehicle 490 may include any suitable roof or frame feature 401 (e.g., glass roof, moon roof, retractable roof, cross bar beam, etc.) that may extend over a space between the seats. Airbag deployment system 491 may include any suitable airbag control module(s) 492, which may be similar to any control module 92 described herein (e.g., inclusive of any suitable sensors 15 (e.g., impact detection sensors, vehicle component positioning sensors (e.g., relative positioning of seats 414), etc.), ECUs, and/or the like), and any suitable controllable airbag subsystem(s) 202' and/or 302' that may be controllable by control module(s) 492. When airbag 207' of airbag subsystem 202' is deployed, it may deploy downwardly from console roof feature 401 towards center console 404 or otherwise, and when airbag 307' of airbag subsystem 302' is deployed, it may deploy upwardly from console 404 and/or console 404s and/or floor 404f towards roof 401. For example, control module 492 of vehicle 490 may be configured to deploy both airbags 207' and 307' at the same time, such that the airbags may impact each other, which may create a pressure zone 413 between the two airbags and/or pressure zones 409m and 409p on respective seats 414m and 414p with any suitable reaction surfaces and/or coefficient of friction materials (e.g., as described with respect to vehicle 290 and/or vehicle 390). Like with subsystem 202 and/or subsystem 302, airbag subsystem 202' and/or subsystem 302' may be configured to promote interaction of the airbag with the other airbag or opposing interaction surface(s) prior to interaction with any side seat surface(s). Therefore, each one of airbags 207' and 307' may push against each other, each providing a reaction surface to the other. One or more sensors 15 of airbag control module 492 may be configured to detect any positioning of any suitable vehicle components, such as seats 414 and/or console 404 and/or travelers and/or of a retractable sunroof and/or the like in order to further protect the traveler(s). Therefore, when a vehicle is detected as experiencing a crash event (e.g., a side crash event), an airbag may be deployed away from a ceiling of the vehicle towards a floor of the vehicle and another airbag may be deployed away from the floor towards the ceiling. During deployment, each airbag may find at least one reaction surface (e.g., a pressure zone) on a console or floor or ceiling and/or on a seat, where the interaction may be configured to create a sufficient holding force to absorb a traveler's impact (e.g., a traveler's head's impact) on the airbag. A neck force of the traveler may not exceed legal limits as impact force may be absorbed by the airbag.

Figure 5:
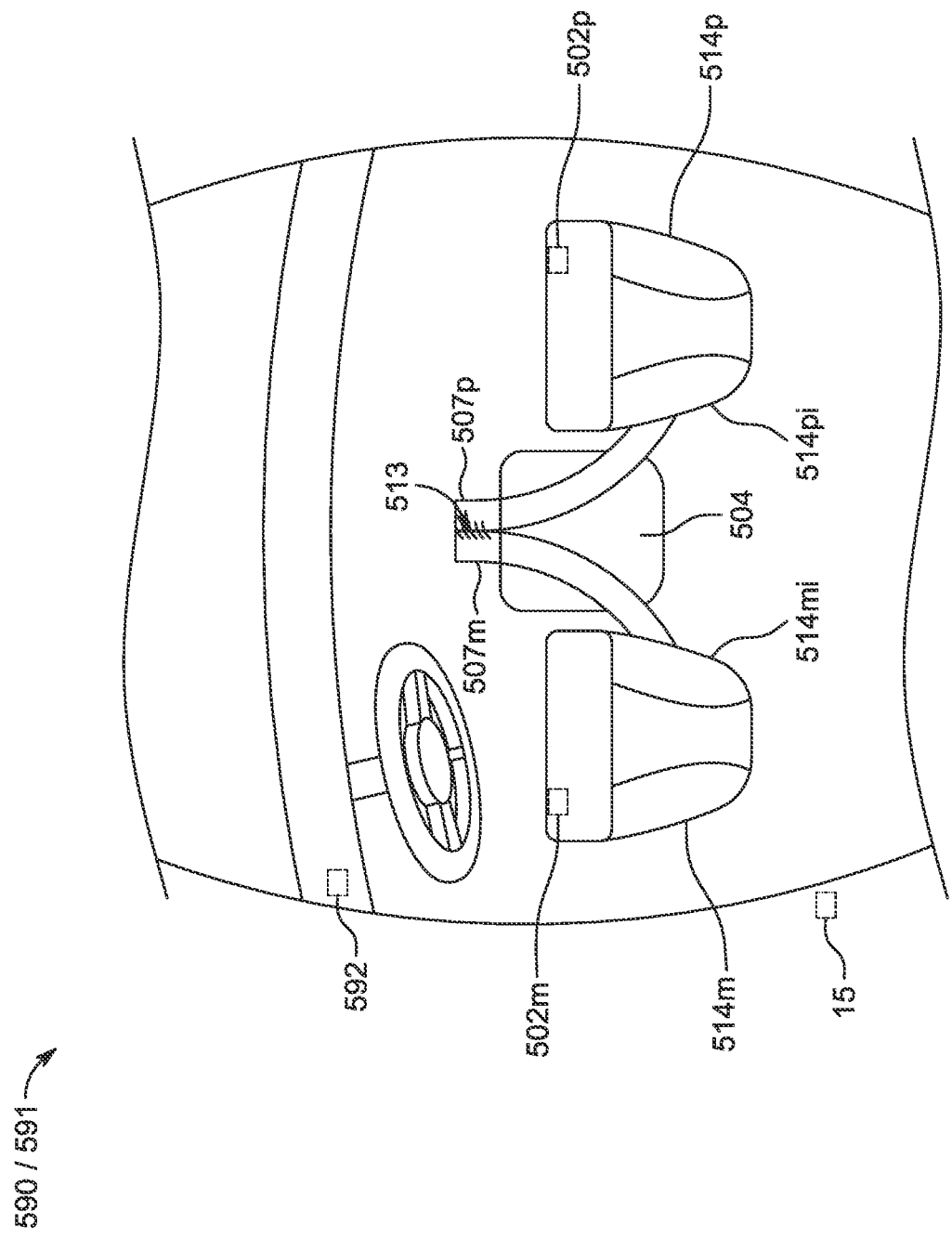
FIG. 5 is a top view of a portion of yet another vehicle with yet another airbag deployment system in accordance with some embodiments of the disclosure.

Additionally or alternatively to deploying an airbag upwardly (e.g., airbag 307 and/or airbag 307') and/or to deploying an airbag downwardly (e.g., airbag 207 and/or airbag 207'), one or more airbags may be deployed sideways from a seat for positioning the deployed airbag(s) between two adjacent traveler seats. For example, as shown in FIG. 5, a vehicle 590 and airbag deployment system 591 may be provided, where vehicle 590 may be any suitable automobile with one or more seats, which may include a main seat 514m (e.g., a driver seat if the vehicle is able to be driven) for a main traveler 515m and a passenger seat 514p for a passenger traveler 515p, as well as any suitable center console 504 that may be positioned at least partially between seats 514m and 514p. Airbag deployment system 591 may include any suitable airbag control module(s) 592, which may be similar to any control module 92 described herein (e.g., inclusive of any suitable sensors 15 (e.g., impact detection sensors, vehicle component positioning sensors (e.g., relative positioning of seats 514), etc.), ECUs, and/or the like), and any suitable controllable airbag subsystem(s) 502m and/or 502p that may be controllable by control module(s) 592. When an airbag 507m of airbag subsystem 502m is deployed, it may deploy sideways from seat 514m (e.g., from interior side surface 514mi of main seat 514m) towards seat 514p, and/or when an airbag 507p of airbag subsystem 502p is deployed, it may deploy sideways from seat 514p (e.g., from interior side surface 514pi of passenger seat 514p) towards seat 514m. For example, control module 592 of vehicle 590 may be configured to deploy both airbags 507m and 507p at the same time, such that the airbags may impact each other, which may create a pressure zone 513 between the two airbags (e.g., each one of airbags 507m and 507p may push against each other, each providing a reaction surface to the other) and/or one or more pressure zone(s) with any downwardly deployed airbag (e.g., airbag 207 and/or airbag 207') and/or one or more pressure zone(s) with any upwardly deployed airbag (e.g., airbag 307 and/or airbag 307') from console 504 (not shown) with any suitable reaction surfaces and/or coefficient of friction materials (e.g., as described with respect to vehicle 290 and/or vehicle 390 and/or vehicle 490). Any suitable combination of sideways, upward, and/or downward deployment airbags may be used by vehicle 590 for providing protection between seats 514. One or more sensors 15 of airbag control module 592 may be configured to detect any positioning of any suitable vehicle components, such as seats 514 and/or console 504 and/or travelers and/or of a retractable sunroof and/or the like in order to further protect the traveler(s). Therefore, when a vehicle is detected as experiencing a crash event (e.g., a side crash event), an airbag may be deployed away from a seat of the vehicle towards another seat of the vehicle. During deployment, the airbag may find a reaction surface (e.g., a pressure zone) on a console or floor or ceiling and/or on a seat and/or on another airbag, where the interaction may be configured to create a sufficient holding force to absorb a traveler's impact (e.g., a traveler's head's impact) on the airbag. A neck force of the traveler may not exceed legal limits as impact force may be absorbed by the airbag.

Figure 6:
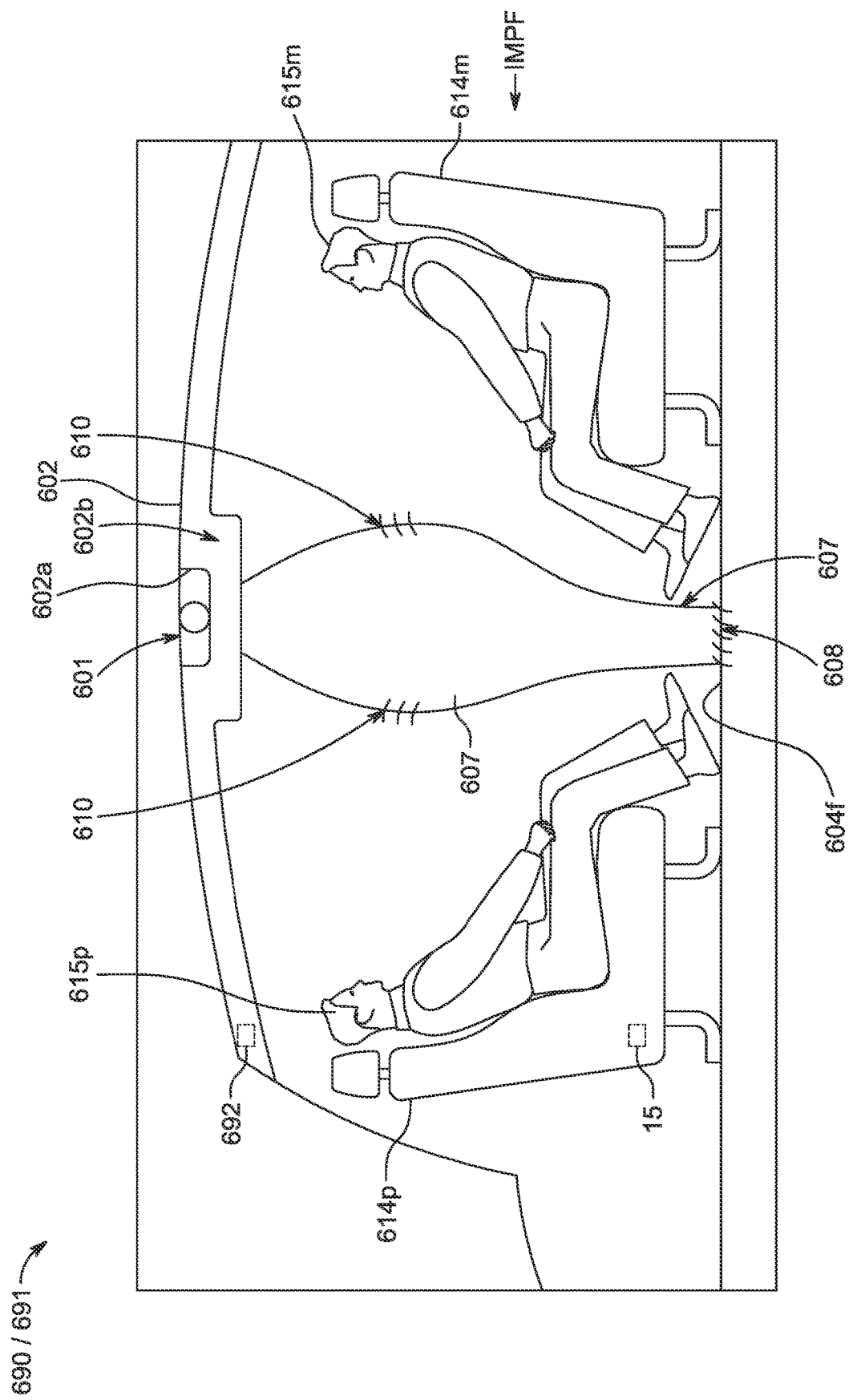
FIG. 6 is a side view of a portion of yet another vehicle with yet another airbag deployment system in accordance with some embodiments of the disclosure.

In some embodiments, rather than deploying an airbag up from a console/floor or down towards a console/floor, an airbag may be deployed upwardly from or downwardly towards a floor of a vehicle (e.g., when no center console may be positioned between two travelers). For example, as shown in FIG. 6, a vehicle 690 and airbag deployment system 691 may be provided, where vehicle 690 may be any suitable automobile with one or more seats, which may include a first seat 614m for a first traveler 615m and a second seat 614p for a second traveler 615p, where the travelers may face each other when seated, as well as a floor portion 604f that may be positioned at least partially between seats 614m and 614p. Airbag deployment system 691 may include any suitable airbag control module(s) 692, which may be similar to any control module 92 described herein (e.g., inclusive of any suitable sensors 15 (e.g., impact detection sensors, vehicle component positioning sensors (e.g., relative positioning of seats 614), etc.), ECUs, and/or the like), and any suitable controllable airbag subsystem(s) 602 (e.g., with elements 602a and 602b) that may be controllable by control module(s) 692. When an airbag 607 of airbag subsystem 602 is deployed, it may deploy downwardly from roof or cross bar 601 towards floor portion 604f, which may create a pressure zone 608 between airbag 607 and floor 604f with any suitable reaction surfaces and/or coefficient of friction materials (e.g., as described with respect to vehicle 290 and/or vehicle 390 and/or vehicle 490 and/or vehicle 590). Like with subsystem 202, airbag subsystem 602 may be configured to promote interaction of the airbag with the floor or opposing interaction surface(s) prior to interaction with any side seat surface(s), if any. The material of the floor may be provided with any suitable characteristics to promote the interaction with and retention of the airbag (e.g., hook-and-loop, magnets, etc.), as described with respect to subsystem 202, subsystem 302, and/or the like. Even if a traveler's feet are in the direct line of deployment, the airbag may wrap around the feet and not injure the traveler's feet when attempting to interact with the floor on which the feet are resting. Alternatively, rather than downward deployment, an upward deployment of an airbag from floor portion 604f towards roof 601 may be utilized (not shown, but may be similar to FIG. 3 and/or FIG. 4) or a combination of both an upward deployed airbag and a downward deployed airbag (not shown, but may be similar to FIG. 4). One or more sensors of airbag control module 692 may be configured to detect any positioning of any suitable vehicle components, such as seats 614 and/or console 604 and/or travelers and/or of a retractable sunroof and/or the like in order to further protect the traveler(s). Therefore, if vehicle 690 is impacted by a crash event in the direction of arrow IMPF (e.g., if the vehicle is hit on the front (e.g., behind first traveler 615m)), then the inertia of second traveler 615p may push second traveler 615p towards the center (e.g., towards seat 614m), such that the second traveler's head and/or shoulder or otherwise may impact an impact zone 610 of deployed airbag 607. This crash event impact may be detected by any suitable sensors (e.g., sensors 15) of airbag control module 692 and processed to immediately generate a signal for rapid deployment of airbag 607 of airbag subsystem 602 (e.g., downward deployment for interacting with a reaction surface on floor portion 604f). Therefore, when a vehicle is detected as experiencing a crash event (e.g., a front crash event), an airbag may be deployed away from a floor of the vehicle towards a ceiling of the vehicle or away from the ceiling towards the floor. During deployment, the airbag may find a reaction surface (e.g., a pressure zone) on a ceiling or floor or otherwise, where the interaction may be configured to create a sufficient holding force to absorb a traveler's impact (e.g., a traveler's head's impact) on the airbag. A force of the traveler may not exceed legal limits as impact force may be absorbed by the airbag.

Figure 7:
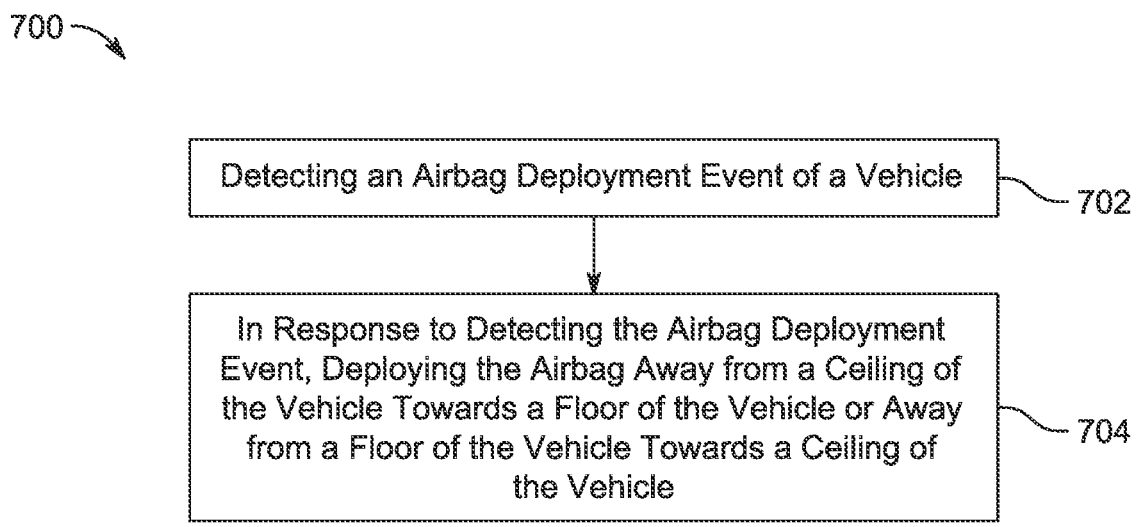
FIG. 7 illustrates a flowchart of an exemplary process for deploying an airbag in a vehicle, in accordance with some embodiments of the disclosure.

FIG. 7 is a flowchart of an illustrative process 700 for deploying an airbag in a vehicle. At operation 702 of process 700, an airbag deployment event of a vehicle may be detected using an airbag deployment system of the vehicle (e.g., any suitable sensor(s) of airbag control module 292 may detect any suitable airbag deployment event (e.g., a side impact crash)). Then, at operation 704 of process 700, in response to detecting the airbag deployment event, the airbag may be deployed, using the airbag deployment system, away from the ceiling towards the floor or away from the floor towards the ceiling (e.g., airbag 207 or airbag 207' or airbag 607 may be deployed towards a floor of a vehicle, or airbag 307 or airbag 307' may be deployed towards a ceiling of a vehicle).

The operations shown in process 700 of FIG. 7 are only illustrative and existing operations may be modified or omitted, additional operations may be added, and the order of certain operations may be altered.

One, some, or all of the processes described with respect to FIGS. 1-7 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 of a subsystem). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one subsystem to another directly or via any suitable network or bus or the like. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

As used in this specification and any claims of this application, the terms "base station," "receiver," "computer," "server," "processor," and "memory" may all refer to electronic or other technological devices. These terms exclude people or groups of people. For the purposes of the specification, the terms "display" or "displaying" means displaying on an electronic device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein refers to and encompasses any and all possible combinations of one or more of the associated listed items. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" may each refer to only A, only B, or only C; any combination of A, B, and C; and/or at least one of each of A, B, and C. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. When used in the claims, the term "or" is used as an inclusive or and not as an exclusive or. For example, the phrase "at least one of x, y, or z" means any one of x, y, and z, as well as any combination thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the terms "computer," "personal computer," "device," "computing device," "router device," and "controller device" may refer to any programmable computer system that is known or that will be developed in the future. In certain embodiments, a computer will be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system," are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The predicate words "configured to," "operable to," "operative to," and "programmed to" do not imply any particular tangible or intangible modification of a subject, but, rather, are intended to be used interchangeably. In one or more implementations, a processor configured to monitor and control an operation or a component nay also mean the processor being programmed to monitor and control the operation or the processor being operable to monitor and control the operation or the processor being operative to monitor and control the operation Likewise, a processor configured to execute code can be construed as a processor programmed to execute code or operable to execute code or operative to execute code.

As used herein, the term "based on" may be used to describe one or more factors that may affect a determination. However, this term does not exclude the possibility that additional factors may affect the determination. For example, a determination may be solely based on specified factors or based on the specified factors as well as other, unspecified factors. The phrase "determine A based on B" specifies that B is a factor that is used to determine A or that affects the determination of A. However, this phrase does not exclude that the determination of A may also be based on some other factor, such as C. This phrase is also intended to cover an embodiment in which A may be determined based solely on B. As used herein, the phrase "based on" may be synonymous with the phrase "based at least in part on."

As used herein, the phrase "in response to" may be used to describe one or more factors that trigger an effect. This phrase does not exclude the possibility that additional factors may affect or otherwise trigger the effect. For example, an effect may be solely in response to those factors, or may be in response to the specified factors as well as other, unspecified factors. The phrase "perform A in response to B" specifies that B is a factor that triggers the performance of A. However, this phrase does not foreclose that performing A may also be in response to some other factor, such as C. This phrase is also intended to cover an embodiment in which A is performed solely in response to B.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 USC. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter/neutral gender (e.g., her and its and they) and vice versa. Headings and subheadings, if any, are used for convenience only and do not limit the subject disclosure.

While there have been described airbags deployable along a height of a traveler in a vehicle and methods for using the same, many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "left" and "right," "up" and "down," "front" and "back" and "rear," "top" and "bottom" and "side," "above" and "below," "length" and "width" and "thickness" and "diameter" and "cross-section" and "longitudinal," "X-" and "Y-" and "Z-," and/or the like, may be used herein only for convenience, and that no fixed or absolute directional or orientational limitations are intended by the use of these terms. For example, the components of the apparatus can have any desired orientation. If reoriented, different directional or orientational terms may need to be used in their description, but that will not alter their fundamental nature as within the scope and spirit of the disclosure.

Therefore, those skilled in the art will appreciate that the concepts of the disclosure can be practiced by other than the described embodiments, which are presented for purposes of illustration rather than of limitation.

What is claimed is:

1. A vehicle comprising:
a ceiling;
a floor; and
an airbag deployment system that comprises an airbag and that is operative to deploy the airbag:
away from the ceiling towards the floor, such that the airbag creates a downward interaction zone with an upward-facing surface of the vehicle and then creates an outward-after-downward interaction zone with an outward-after-downward surface of the vehicle; or
away from the floor towards the ceiling, such that the airbag creates an upward interaction zone with a downward-facing surface of the vehicle and then creates an outward-after-upward interaction zone with an outward-after-upward surface of the vehicle.

2. The vehicle of claim 1, wherein the airbag deployment system is operative to deploy the airbag away from the ceiling towards the floor.

3. The vehicle of claim 2, wherein the airbag deployment system further comprises another airbag and is further operative to deploy the other airbag away from the floor towards the airbag.

4. The vehicle of claim 2, wherein:
the vehicle further comprises:
a first seat between the ceiling and floor; and
a second seat between the ceiling and floor; and
the airbag deployment system is operative to deploy the airbag away from the ceiling towards the floor into a space that is at least partially between the first seat and the second seat.

5. The vehicle of claim 4, wherein the airbag deployment system further comprises another airbag and is further operative to deploy the other airbag away from the floor towards the airbag into the space.

6. The vehicle of claim 4, wherein:
the vehicle further comprises a console between the first seat and the second seat;
the console comprises the upward-facing surface; and
the airbag deployment system is operative to deploy the airbag away from the ceiling such that an airbag portion of the airbag contacts and pushes against the upward-facing surface of the console.

7. The vehicle of claim 6, wherein:
the airbag portion comprises a first friction feature;
the upward-facing surface comprises a second friction feature operative to ensure a coefficient of friction with the first friction feature that is sufficient to prevent motion of the airbag portion with respect to the upward-facing surface during an airbag deployment event.

8. The vehicle of claim 6, wherein:
the airbag portion comprises a first friction feature;
the upward-facing surface comprises a second friction feature operative to physically couple with the first friction feature.

9. The vehicle of claim 8, wherein at least one of the first friction feature or the second friction feature comprises a hook, a loop, or a magnet.

10. The vehicle of claim 6, wherein:
the first seat comprises the outward-after-downward surface; and
the airbag deployment system is operative to deploy the airbag away from the ceiling such that another airbag portion of the airbag contacts and pushes against the outward-after-downward surface of the first seat.

11. The vehicle of claim 10, wherein the airbag deployment system is operative to deploy the airbag away from the ceiling such that yet another airbag portion of the airbag contacts and pushes against a seat portion of at least one surface of the second seat.

12. The vehicle of claim 2, wherein:
the vehicle further comprises a seat between the ceiling and floor; and
the seat comprises the outward-after-downward surface.

13. The vehicle of claim 12, wherein:
the airbag deployment system further comprises another airbag;
the airbag deployment system is further operative to deploy the other airbag away from the floor towards the airbag; and
the other airbag comprises the upward-facing surface.

14. The vehicle of claim 2, wherein:
the vehicle further comprises:
a sidewall; and
a seat between the ceiling and the floor; and
an exterior side surface of the seat faces the sidewall and comprises the outward-after-downward surface.

15. The vehicle of claim 2, wherein the upward-facing surface faces the ceiling.

16. The vehicle of claim 2, wherein the upward-facing surface is provided by one of:
the floor;
a top of a console of the vehicle; or
a seat of the vehicle.

17. The vehicle of claim 2, wherein the outward-after-downward surface is provided by a seat of the vehicle.

18. The vehicle of claim 2, wherein:
the airbag comprises a first retention element; and
at least one of the upward-facing surface or the outward-after-downward surface comprises a second retention element that is operative to promote retention to the first retention element.

19. The vehicle of claim 18, wherein:
the first retention element and the second retention element are magnets of opposite polarity; or
the first retention element and the second retention element are a hook-and-loop fastener assembly.

20. The vehicle of claim 1, wherein the airbag deployment system is operative to deploy the airbag away from the floor towards the ceiling.

21. The vehicle of claim 20, wherein:
the vehicle further comprises:
a first seat between the ceiling and floor; and
a second seat between the ceiling and floor; and
the airbag deployment system is operative to deploy the airbag away from the floor towards the ceiling into a space that is at least partially between the first seat and the second seat.

22. The vehicle of claim 21, wherein:
the ceiling comprises the downward-facing surface; and
the airbag deployment system is operative to deploy the airbag away from the floor such that an airbag portion of the airbag contacts and pushes against the downward-facing surface of the ceiling.

23. The vehicle of claim 20, wherein:
the ceiling comprises the downward-facing surface; and
the airbag deployment system is operative to deploy the airbag away from the floor such that an airbag portion of the airbag contacts and pushes against the downward-facing surface of the ceiling.

24. The vehicle of claim 20, wherein:
the vehicle further comprises a console;
the ceiling comprises the downward-facing surface; and
the airbag deployment system is operative to deploy the airbag out from the console such that an airbag portion of the airbag contacts and pushes against the downward-facing surface of the ceiling.

25. The vehicle of claim 20, wherein:
the vehicle further comprises:
a first seat between the ceiling and floor;
a second seat between the ceiling and floor; and
a console between the first seat and the second seat;
the first seat comprises the outward-after-upward surface; and
the airbag deployment system is operative to deploy the airbag out from the console such that an airbag portion of the airbag contacts and pushes against the outward-after-upward surface of the first seat.

26. The vehicle of claim 25, wherein the airbag deployment system is operative to deploy the airbag out from the console such that another airbag portion of the airbag contacts and pushes against a seat portion of at least one surface of the second seat.

27. The vehicle of claim 20, wherein:
the vehicle further comprises a seat between the ceiling and floor; and
the seat comprises the outward-after-upward surface.

28. The vehicle of claim 27, wherein:
the airbag deployment system further comprises another airbag;
the airbag deployment system is further operative to deploy the other airbag away from the ceiling towards the airbag; and
the other airbag comprises the downward-facing surface.

29. The vehicle of claim 20, wherein:
the vehicle further comprises:
a sidewall; and
a seat between the ceiling and the floor; and
an exterior side surface of the seat faces the sidewall and comprises the outward-after-upward surface.

30. The vehicle of claim 20, wherein the downward-facing surface faces the floor.

31. The vehicle of claim 20, wherein the outward-after-upward surface is provided by a seat of the vehicle.

32. The vehicle of claim 20, wherein:
the airbag comprises a first retention element; and
at least one of the downward-facing surface or the outward-after-upward surface comprises a second retention element that is operative to promote retention to the first retention element.

33. The vehicle of claim 32, wherein:
the first retention element and the second retention element are magnets of opposite polarity; or
the first retention element and the second retention element are a hook-and-loop fastener assembly.

34. The vehicle of claim 1, wherein:
the vehicle further comprises:
a first seat between the ceiling and floor; and
a second seat between the ceiling and floor; and
the airbag deployment system is operative to deploy the airbag into a space that is at least partially between the first seat and the second seat.

35. The vehicle of claim 34, wherein the airbag deployment system is operative to deploy the airbag into the space such that the airbag creates an interaction zone with a surface of the first seat.

36. The vehicle of claim 34, wherein the airbag deployment system further comprises another airbag and is further operative to deploy the other airbag away from the first seat towards the second seat.

37. The vehicle of claim 36, wherein the airbag deployment system further comprises yet another airbag and is further operative to deploy the yet another airbag away from the second seat towards the first seat.

38. The vehicle of claim 1, wherein the airbag deployment system is, prior to the deployment of the airbag, further operative to:
detect a positioning between a first vehicle component and a second vehicle component; and
adjust a characteristic of the deployment of the airbag based on the detected positioning.

39. The vehicle of claim 38, wherein one of the following is true:
the first vehicle component is a first seat positioned between the floor and the ceiling and the second vehicle component is a second seat positioned between the floor and the ceiling;
the first vehicle component is a component of the vehicle that initially suffers a crash event and the second vehicle component is a seat positioned between the floor and the ceiling;
the first vehicle component is a sun roof opening in the ceiling and the second vehicle component is a sun roof movable with respect to the sun roof opening;
the first vehicle component is a seat positioned between the floor and the ceiling and the second vehicle component is a console adjacent to the seat; or
the first vehicle component is a seat positioned between the floor and the ceiling and the second vehicle component is a dashboard positioned adjacent to the seat.

40. The vehicle of claim 39, wherein a characteristic of the deployment of the airbag comprises one of the following:
a launch angle of the deployment of the airbag;
a position of the airbag relative to the first vehicle component;
an initial force of the deployment of the airbag; or
a distance between a portion of the first vehicle component and a portion of the second vehicle component.

41. The vehicle of claim 38, wherein a characteristic of the deployment of the airbag comprises one of the following:
a launch angle of the deployment of the airbag;
a position of the airbag relative to the first vehicle component;
an initial force of the deployment of the airbag; or
a distance between a portion of the first vehicle component and a portion of the second vehicle component.

42. A method for deploying an airbag in a vehicle that comprises a ceiling, a floor, and an airbag deployment system comprising an airbag, the method comprising:
detecting, using the airbag deployment system, an airbag deployment event of the vehicle; and
in response to detecting the airbag deployment event, deploying, using the airbag deployment system, the airbag:
away from the ceiling towards the floor, such that the airbag creates a downward pressure zone with an upward-facing surface of the vehicle and then creates an outward-after-downward pressure zone with an outward-after-downward surface of the vehicle; or
away from the floor towards the ceiling, such that the airbag creates an upward pressure zone with a downward-facing surface of the vehicle and then creates an outward-after-upward pressure zone with an outward-after-upward surface of the vehicle.

43. A non-transitory computer-readable storage medium storing at least one program, the at least one program comprising instructions, which, when executed by at least one processor of an electronic airbag deployment system of a vehicle comprising an airbag, cause the at least one processor to:
  detect, using the airbag deployment system, an airbag deployment event of the vehicle; and
  in response to detection of the airbag deployment event, deploy, using the airbag deployment system, the airbag:
    away from the ceiling towards the floor, such that the airbag creates a downward retention zone with an upward-facing surface of the vehicle and then creates an outward-after-downward retention zone with an outward-after-downward surface of the vehicle; or
    away from the floor towards the ceiling, such that the airbag creates an upward retention zone with a downward-facing surface of the vehicle and then creates an outward-after-upward retention zone with an outward-after-upward surface of the vehicle.

* * * * *